US009898068B2

(12) United States Patent
Sado et al.

(10) Patent No.: US 9,898,068 B2
(45) Date of Patent: Feb. 20, 2018

(54) SEMICONDUCTOR DEVICE, ELECTRONIC DEVICE, AND METHOD FOR CONTROLLING SEMICONDUCTOR DEVICE

(71) Applicant: Renesas Electronics Corporation, Tokyo (JP)

(72) Inventors: Go Sado, Tokyo (JP); Masaki Fujigaya, Tokyo (JP); Kohei Wakahara, Tokyo (JP); Keiji Hasegawa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 358 days.

(21) Appl. No.: 14/158,832

(22) Filed: Jan. 19, 2014

(65) Prior Publication Data
US 2014/0215243 A1    Jul. 31, 2014

(30) Foreign Application Priority Data

Jan. 28, 2013  (JP) .................................. 2013-012958

(51) Int. Cl.
*G06F 1/32*   (2006.01)
(52) U.S. Cl.
CPC ............ *G06F 1/324* (2013.01); *G06F 1/3243* (2013.01); *Y02B 60/1217* (2013.01); *Y02B 60/1239* (2013.01)
(58) Field of Classification Search
CPC ....................................................... G06F 1/324
USPC ........................................................ 713/322
See application file for complete search history.

(56) References Cited

U.S. PATENT DOCUMENTS

| | | | | |
|---|---|---|---|---|
| 6,952,782 B2 * | 10/2005 | Staiger | .................. | G06F 1/3203 711/108 |
| 8,245,057 B2 * | 8/2012 | Lyu | ........................ | G06F 1/3203 713/300 |
| 2002/0184545 A1 * | 12/2002 | Oshima | .................. | G06F 1/3203 713/321 |
| 2003/0115495 A1 * | 6/2003 | Rawson, III | .......... | G06F 1/3228 713/324 |
| 2003/0140264 A1 * | 7/2003 | Kawano | ................ | G06F 1/3203 713/500 |

(Continued)

FOREIGN PATENT DOCUMENTS

| | | |
|---|---|---|
| JP | 2002-288150 A | 10/2002 |
| JP | 2003-288132 A | 10/2003 |

(Continued)

OTHER PUBLICATIONS

Office Action, dated Aug. 2, 2016, in Japanese Application No. 2013-012958.

*Primary Examiner* — Jaweed A Abbaszadeh
*Assistant Examiner* — Sumil Desai
(74) *Attorney, Agent, or Firm* — Shapiro, Gabor and Rosenberger, PLLC

(57) ABSTRACT

A semiconductor device includes a CPU core, a frequency regulating circuit, and a frequency control circuit. The frequency regulating circuit includes a table. The frequency control circuit provides a clock to the CPU core. The CPU core outputs an operating state signal indicating an operating state of the CPU core. The frequency regulating circuit controls a frequency of the clock based on the table and the operating state signal. Thus it is possible to provide a semiconductor device that allows performance to follow a dynamically changing load.

15 Claims, 25 Drawing Sheets

(56) References Cited

U.S. PATENT DOCUMENTS

| | | | |
|---|---|---|---|
| 2005/0071705 A1* | 3/2005 | Bruno | G06F 1/206 713/500 |
| 2007/0300085 A1* | 12/2007 | Goodrum | G06F 1/3203 713/300 |
| 2009/0049314 A1* | 2/2009 | Taha | G06F 1/3203 713/300 |
| 2009/0077407 A1 | 3/2009 | Akimoto | |
| 2009/0249094 A1* | 10/2009 | Marshall | G06F 1/3203 713/320 |
| 2010/0281278 A1* | 11/2010 | Hsiao | G06F 1/08 713/300 |
| 2012/0095728 A1* | 4/2012 | Ubukata | G06F 11/3409 702/186 |

FOREIGN PATENT DOCUMENTS

| | | |
|---|---|---|
| JP | 2005-285093 A | 10/2005 |
| JP | 2006-314006 A | 11/2006 |
| JP | 2007-057320 A | 3/2007 |
| JP | 2009-070328 A | 4/2009 |
| JP | 2009-230670 A | 10/2009 |

* cited by examiner

Fig. 8

| POINT | FRQ VALUE | PERFORMANCE VALUE |
|---|---|---|
| P0 | 10% | 0 |
| P1 | 40% | 10 |
| P2 | 65% | 20 |
| P3 | 80% | 30 |
| P4 | 90% | 50 |
| P5 | 90% | 85 |

Fig. 9

| POINT | FRQ VALUE | PERFORMANCE VALUE |
|---|---|---|
| P0 | 10% | 0 |
| P0-A | 25% | 5 |
| P1 | 40% | 10 |
| P1-A | 52% | 15 |
| P2 | 65% | 20 |
| P2-A | 72% | 25 |
| P3 | 80% | 30 |
| P3-A | 82% | 35 |
| P3-B | 85% | 40 |
| P3-C | 87% | 45 |
| P4 | 90% | 50 |
| P4-A | 90% | 55 |
| P4-B | 90% | 60 |
| P4-C | 90% | 65 |
| P4-D | 90% | 70 |
| P5 | 90% | 85 |

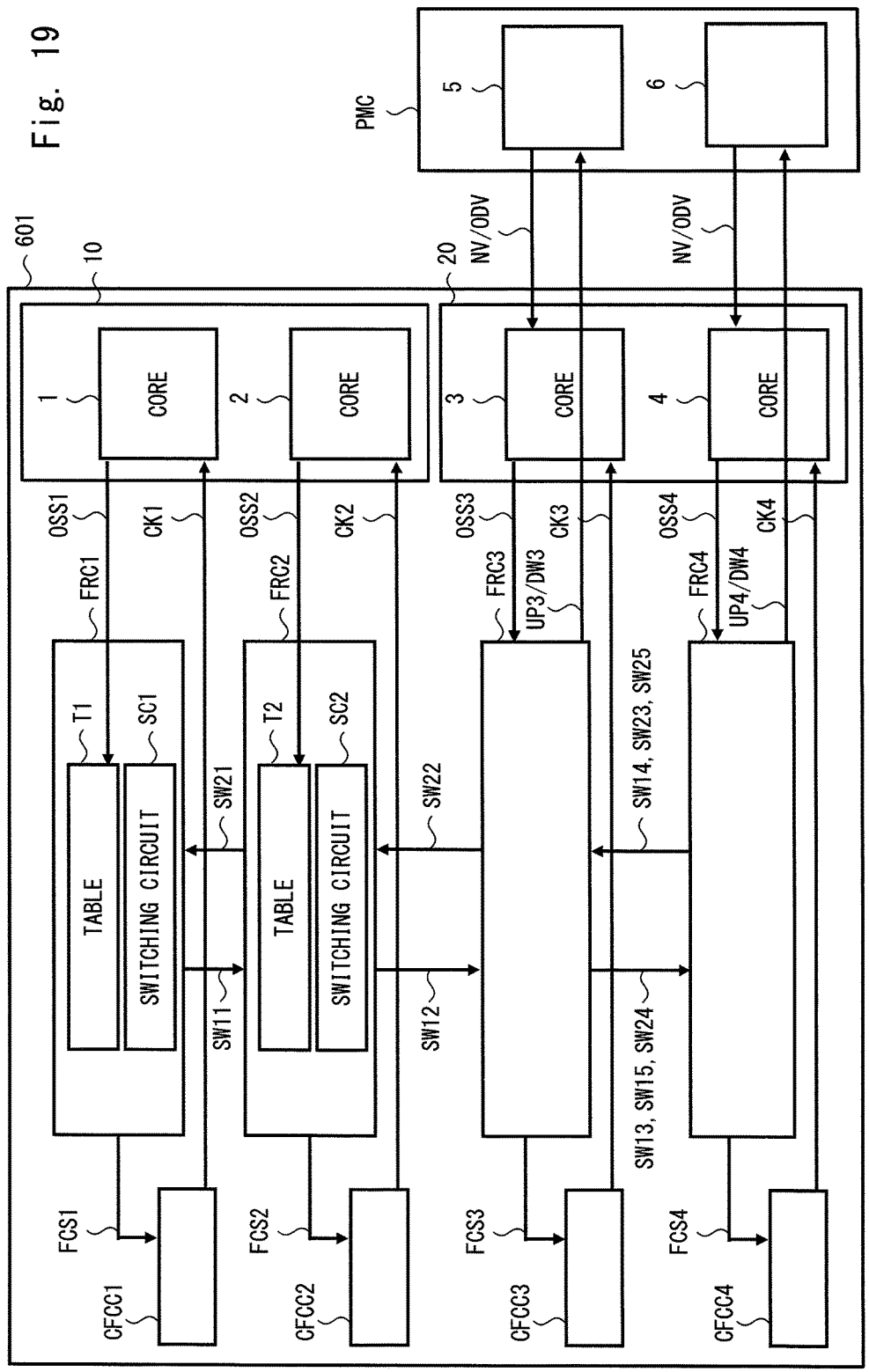

SEMICONDUCTOR DEVICE, ELECTRONIC DEVICE, AND METHOD FOR CONTROLLING SEMICONDUCTOR DEVICE

CROSS-REFERENCE TO RELATED APPLICATIONS

This application is based upon and claims the benefit of priority from Japanese patent application No. 2013-012958, filed on Jan. 28, 2013, the disclosure of which is incorporated herein in its entirety by reference.

BACKGROUND

The present invention relates to a semiconductor device, an electronic device, and a method for controlling a semiconductor device.

It is required that power consumption of semiconductor devices be reduced while also ensuring the required performance thereof.

For example, Japanese Unexamined Patent Application Publication No. 2002-288150 discloses a semiconductor integrated circuit device including a high-performance central processing unit (CPU), a low-power-consumption CPU, a process judgment unit, a power supply voltage control management unit, and a clock supply control unit. The process judgment unit determines whether the high-performance CPU or the low-power-consumption CPU is the optimum CPU to be used, on the basis of a process to be executed by the semiconductor integrated circuit device. The power supply voltage control management unit controls power supply to the high-performance CPU and the low-power-consumption CPU on the basis of the determination result made by the process judgment unit. The clock supply control unit controls clock supply to the high-performance CPU and the low-power consumption CPU on the basis of the determination result made by the process judgment unit.

Japanese Unexamined Patent Application Publication No. 2005-285093 discloses a power supply device for supplying power to a processor. The power supply device includes a required task performance table, a power mode table, a required system performance calculation block, and a power mode determination block. The required task performance table stores performance required for each of a plurality of tasks to be executed by the processor. In the power mode table, an operating frequency and an application voltage which the processor uses to achieve required system performance are defined. The required system performance calculation block calculates required system performance on the basis of the required task performance table. The power mode determination block sets the operating frequency and application voltage of the processor on the basis of the required system performance calculated by the required system performance calculation block and the power mode table.

SUMMARY

The inventors have found various problems when developing semiconductor devices. Each of the embodiments disclosed in the present application provides a semiconductor device which allows performance to follow a dynamically changing load.

Other problems and novel characteristics will be apparent from the description of the present specification and the accompanying drawings.

A semiconductor device according to one embodiment includes a frequency regulating circuit including a table. The frequency regulating circuit controls the frequency of a clock to be provided to a CPU core, on the basis of the table and an operating state signal output by the CPU core.

According to the one embodiment, it is possible to provide a semiconductor device that allows performance to follow a dynamically changing load.

BRIEF DESCRIPTION OF THE DRAWINGS

The above and other aspects, advantages and features will become more apparent from the following description of certain embodiments taken in conjunction with the accompanying drawings, in which:

FIG. 8 shows values stored in registers included in the table according to the first embodiment;

FIG. 9 shows values stored in a parameter table included in the table according to the first embodiment;

FIG. 19 is a block diagram of a semiconductor device according to a third embodiment;

DETAILED DESCRIPTION

Now, specific embodiments will be described in detail with reference to the accompanying drawings. Note that the following description and drawings are simplified as appropriate in order to provide a clear explanation.

<Configuration of Semiconductor Device According to Comparative Example>

Figure 1:
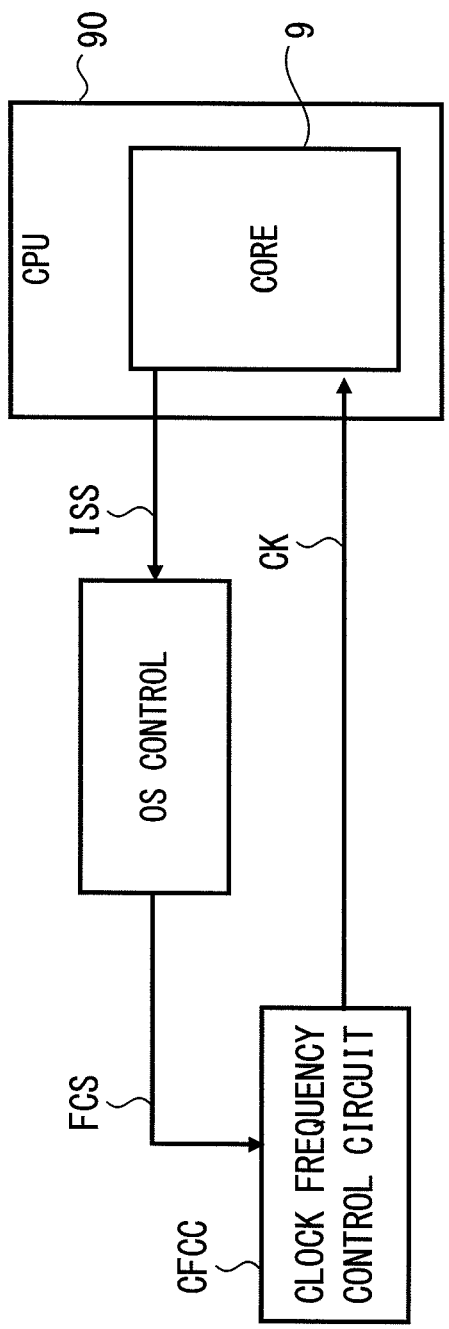
FIG. 1 is a block diagram of a semiconductor device according to a comparative example.

First, referring to FIG. 1, the configuration of a semiconductor device according to a comparative example examined by the inventors will be described. The semiconductor device according to the comparative example includes a CPU 90 and a clock frequency control circuit CFCC.

<Operation of Semiconductor Device According to Comparative Example>

Next, the operation of the semiconductor device according to the comparative example will be described. The clock frequency control circuit CFCC provides a clock CK to a core 9 of the CPU 90. The core 9 performs a process on the basis of the clock CK. The core 9 also generates an idle state signal ISS indicating the idle state of the core 9. The CPU 90 generates a frequency control signal FCS on the basis of the idle state signal ISS under OS (operating system) control. The frequency control signal FCS indicates the set frequency of the clock CK. The clock frequency control circuit CFCC controls the frequency of the clock CK on the basis of the frequency control signal FCS.

Figure 2:
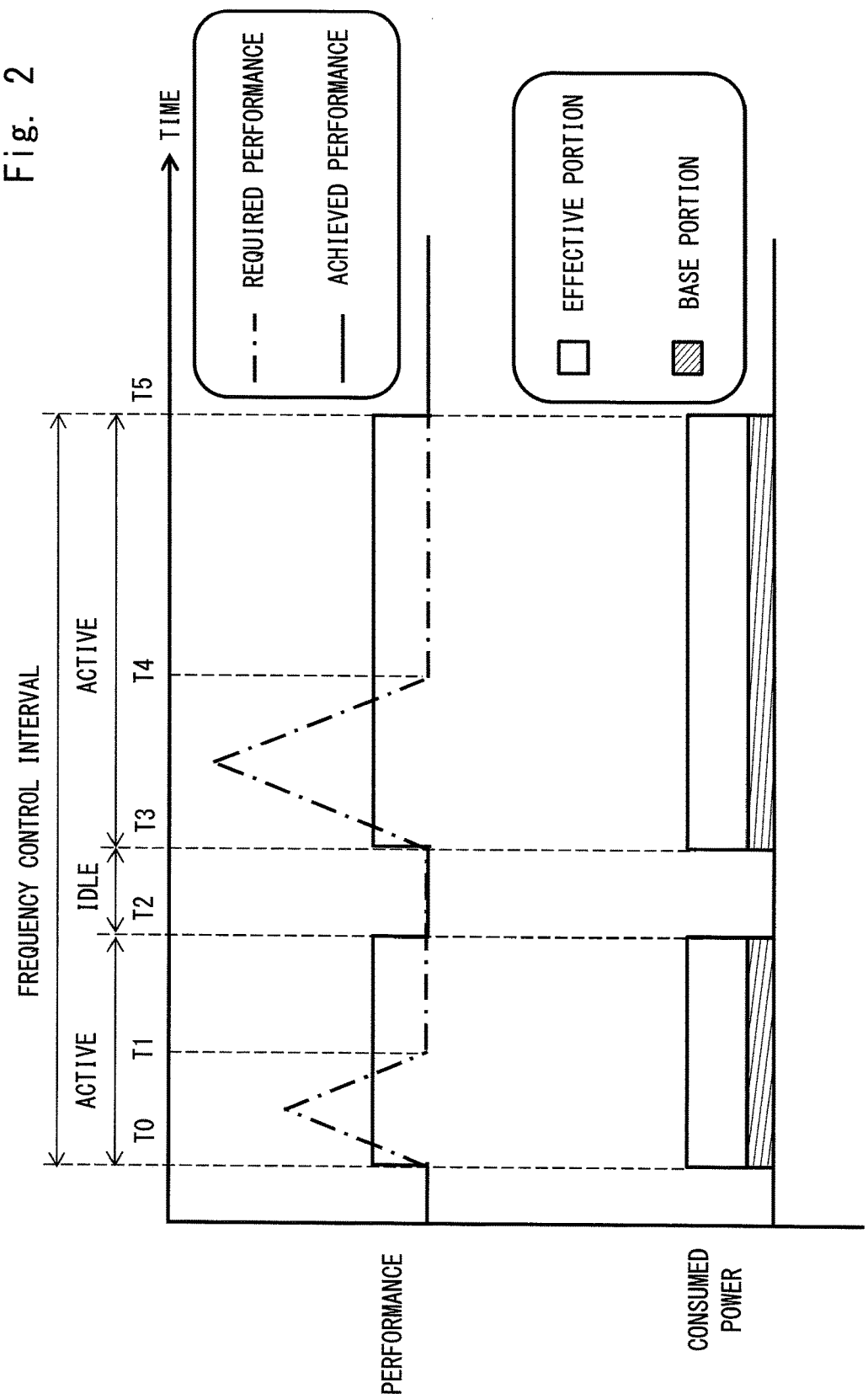
FIG. 2 is a conceptual diagram of a method for controlling the semiconductor device according to the comparative example.

Referring to FIG. 2, the operation of the semiconductor device according to the comparative example will be described in detail. The CPU 90 controls the frequency of the clock CK at regular frequency control intervals under OS control. Specifically, the CPU 90 calculates the active time ratio of the core 9 at each frequency control interval on the basis of the idle state signal ISS. The active time ratio is the proportion of the active state time in a frequency control interval. Based on the active time ratio, the CPU 90 generates a frequency control signal FCS indicating the set frequency of the clock CK. Based on the frequency control signal FCS, the clock frequency control circuit CFCC controls the frequency of the clock CK.

Hereafter, problems with the method of controlling the frequency of the clock CK on the basis of the calculated active time ratio of the core 9 under OS control will be described.

The method of controlling the frequency of the clock CK on the basis of the active time ratio needs a long frequency control interval. For this reason, if the performance required of the core 9 dynamically changes, the performance achieved by the core 9 cannot follow the required performance. Specifically, the frequency of the clock CK is constant at the frequency control interval from time T0 to time T5. Accordingly, the achieved performance is limited to a level corresponding to the constant frequency. If the frequency of the clock CK is insufficient to meet the required performance, the core 9 remains in an active state even after the required performance falls to zero. For example, while the required performance falls to zero at time T1, the active state which has started at time T0 is extended until time T2 in order to process tasks which the core 9 has not been able to process by time T1. While the required performance falls to zero at time T4, the active state which has started at time T3 is extended until time T5 in order to process tasks which the core 9 has not been able to process by time T4.

The power consumption of the core 9 includes a base portion and an effective portion. The base portion is power which is required as long as the core 9 is placed in an active state. The effective portion is power which is required in accordance with the performance achieved by the core 9. If the active state is extended, the base portion of the power consumption is expanded. Further, the software control may fail. In this case, by setting the lower limit of the set frequency of the clock CK to a high value, the extension of the active state can be avoided. However, power consumption would be increased in a case that the required performance is constant at a low value.

Further, at each frequency control interval, overhead occurs where the CPU 90 must calculate the active time ratio under OS control. Accordingly, it is difficult to shorten the frequency control interval. Note that the overhead is omitted in FIG. 2.

First Embodiment

Overview of Wireless Communication Terminal

Firstly, with reference to FIGS. 3A and 3B, an explanation will be given of an overview of a wireless communication terminal suitable for use as an electronic device to which a semiconductor device according to a first embodiment is applied. Each of FIGS. 3A and 3B is an exterior view showing an exemplary structure of a wireless communication terminal 500.

Figure 3A:
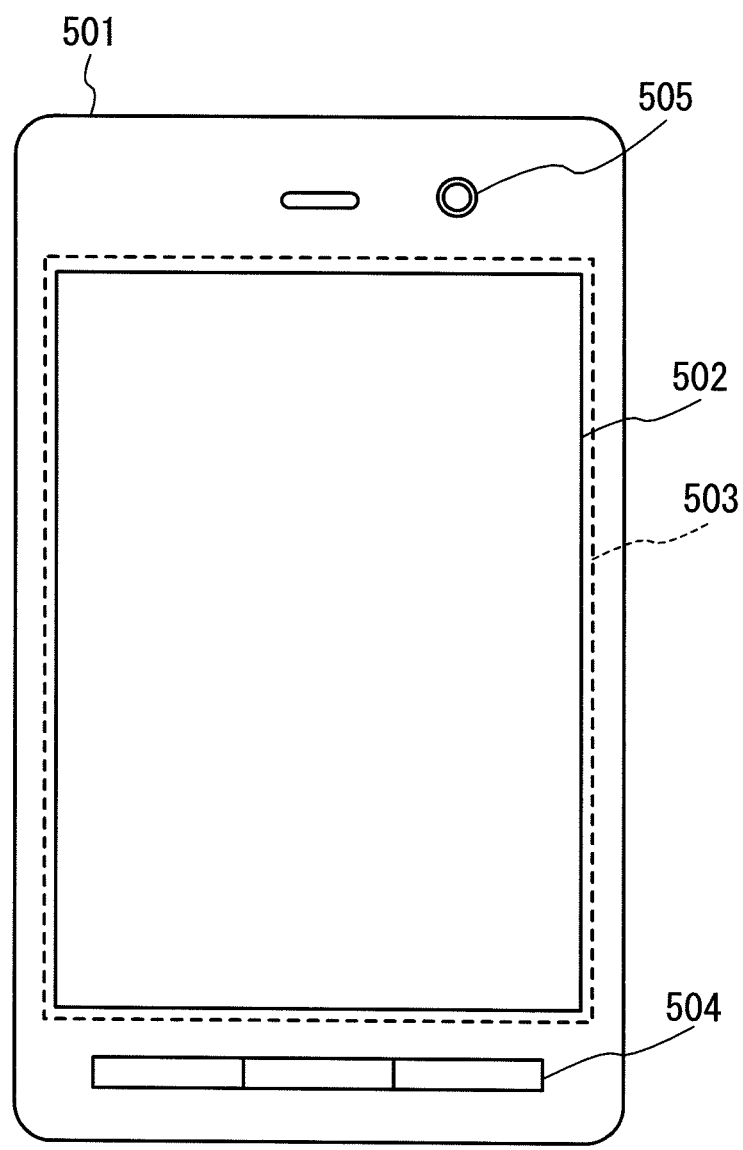
FIG. 3A is a front view of a wireless communication terminal according to a first embodiment.
Figure 3B:
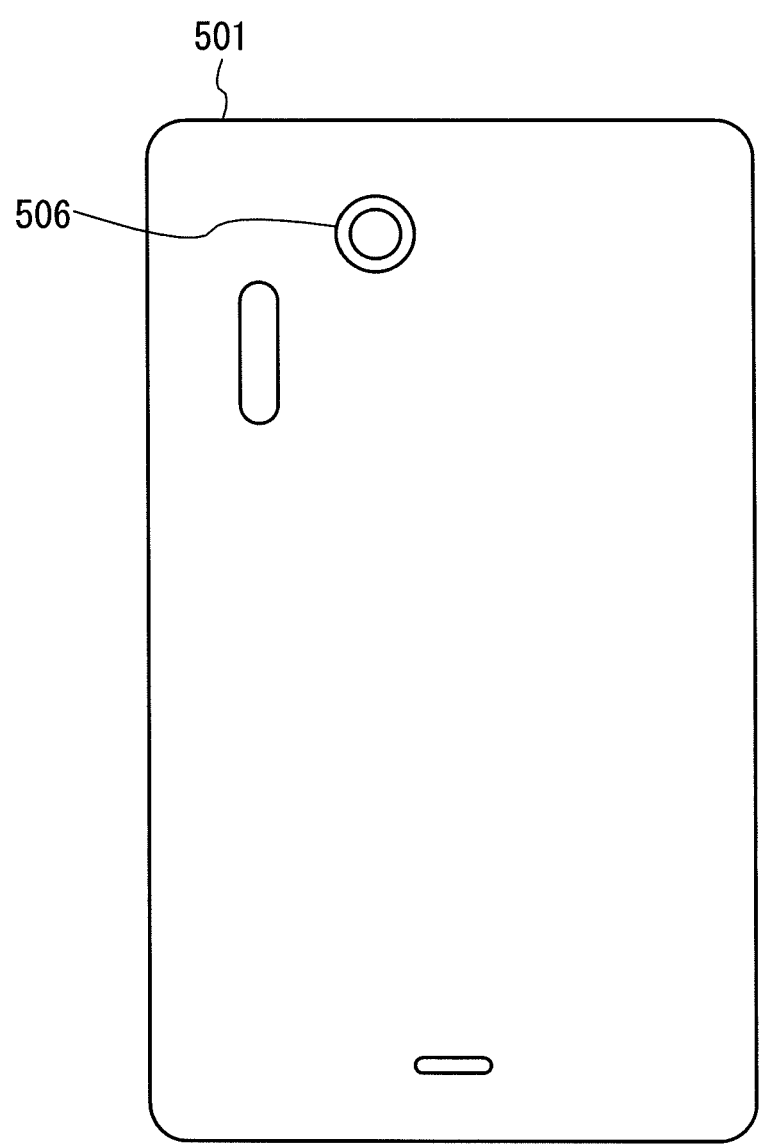
FIG. 3B is a rear view of the wireless communication terminal according to the first embodiment.

Note that FIGS. 3A and 3B each show the case where the wireless communication terminal 500 is a smartphone. However, the wireless communication terminal 500 may be another wireless communication terminal such as a feature phone (e.g., a flip mobile phone terminal), a portable game terminal, a tablet PC (Personal Computer), a notebook PC, a car navigation device, and the like. Needless to say, the semiconductor device according to the present embodiment is applicable to any device other than wireless communication terminals.

FIG. 3A shows one main surface (front face) of a housing 501 that forms the wireless communication terminal 500. On the front face of the housing 501, a display device 502, a touch panel 503, a plurality of operation buttons 504, and a camera device 505 are disposed. On the other hand, FIG. 3B shows the other main surface (back face) of the housing 501. On the back face of the housing 501, a camera device 506 is disposed.

The display device 502 is a display device such as a liquid crystal display (LCD: Liquid Crystal Display), an organic EL display (OLED: Organic Light-Emitting Diode) and the like. The display device 502 is disposed such that the displaying face is positioned on the front face of the housing 501.

The touch panel 503 is disposed so as to cover the displaying face of the display device 502. Alternatively, it is disposed on the back side of the display device 502. The touch panel 503 senses the position on the displaying face touched by the user. That is, the user can intuitively operate the wireless communication terminal 500 by touching the displaying face of the display device 502 with a finger, a dedicated pen (generally referred to as a stylus) and the like.

The operation buttons 504 are used for auxiliary operating of the wireless communication terminal 500. Note that such operation buttons may not be provided depending on the wireless communication terminals.

The camera device 505 is a sub-camera whose lens unit is positioned on the front face of the housing 501. Note that such a sub-camera may not be provided depending on the wireless communication terminals.

The camera device 506 is a main camera whose lens unit is positioned on the back face of the housing 501.

<Structure of Wireless Communication Device>

Figure 4:
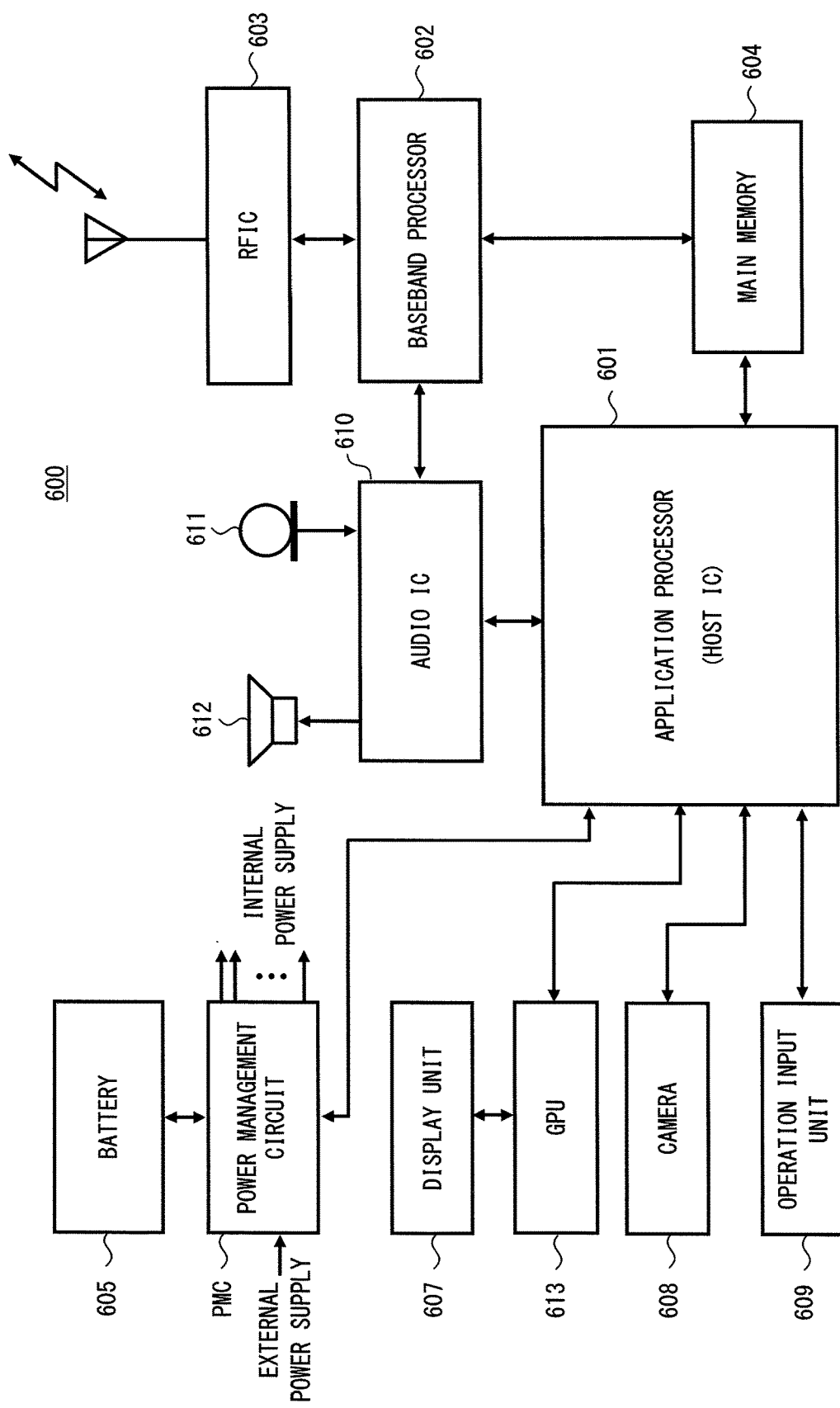
FIG. 4 is a block diagram of a wireless communication device included in the wireless communication terminal according to the first embodiment.

With reference to FIG. 4, an explanation will be given of the structure of a wireless communication device 600 in which the semiconductor device according to the present embodiment is installed. FIG. 4 is a block diagram showing an exemplary structure of the wireless communication device 600 according to the first embodiment. The wireless communication device 600 is, for example, the internal structure of the wireless communication terminal 500 shown in the FIGS. 3A and 3B. As shown in FIG. 4, the wireless communication device 600 includes an application processor (host IC) 601, a baseband processor 602, an RFIC (Radio Frequency Integrated Circuit) 603, a main memory 604, a battery 605, a power management circuit PMC, a display unit 607, a camera unit 608, an operation input unit 609, an audio IC 610, a microphone 611, a speaker 612, and a GPU (Graphics Processor Unit) 613. The power management circuit PMC is, for example, a power management IC (PMCI: Power Management Integrated Circuit).

The application processor (host IC) 601 is a semiconductor integrated circuit that reads programs stored in the main memory 604 to carry out processing for implementing various functions of the wireless communication device 600. For example, the application processor 601 reads an OS (Operating System) program from the main memory 604 and executes the same, and executes any application program that operates on the OS program.

The baseband processor 602 subjects data transmitted and received by the mobile communication terminal to baseband processing, which includes an encoding process (e.g., error correction coding of convolution codes, turbo codes and the like), a decoding process and the like.

Particularly as to voice data, the baseband processor 602 receives transmission voice data from the audio IC 610 and performs an encoding process on the received transmission voice data, and transmits the encoded transmission voice data to the RFIC 603. More specifically, the baseband processor 602 performs an encoding process on PCM (Pulse Code Modulation) data received from the audio IC 610, so that the PCM data is converted into AMR (Adaptive Multi Rate) data that can be received by the RFIC 603.

On the other hand, the baseband processor 602 receives reception voice data from the RFIC 603 and performs a decoding process on the received reception voice data, and transmits the decoded reception voice data to the audio IC 610. More specifically, the baseband processor 602 performs a decoding process on AMR data, which is the reception voice data demodulated by the RFIC 603, so that the AMR data is converted into PCM data. Note that the AMR data is compressed data and the PCM data is uncompressed data.

The RFIC 603 performs analog RF signal processing. The analog RF signal processing includes frequency upconversion, frequency downconversion, amplification and the like.

Particularly as to voice data, the RFIC 603 generates a transmission RF signal from transmission voice data modulated by the baseband processor 602, and transmits the transmission RF signal via an antenna in a wireless manner (Up Link).

On the other hand, the RFIC 603 receives a reception RF signal via the antenna in a wireless manner and generates reception voice data from the reception RF signal, and transmits the generated reception voice data to the baseband processor 602 (Down Link).

The main memory (external memory) 604 stores programs and data that are used by the application processor 601. Further, the main memory 604 stores the program that is used for a vocoder process performed by the baseband processor 602, that is, a codec. A volatile memory such as a DRAM (Dynamic Random Access Memory) is frequently used as the main memory 604. Stored data in a volatile memory is cleared when power supply is shut down. Needless to say, a non-volatile memory that retains stored data even when power supply is shut down may be used as the main memory 604.

The battery 605 is an electric battery, and used when the wireless communication device 600 operates independently of an external power supply. Note that the wireless communication device 600 may be supplied with power from the battery 605 even when it is connected to any external power supply. Further, it is preferable to use a secondary battery as the battery 605.

The power management circuit PMC generates an internal power supply from the battery 605 or an external power supply. This internal power supply is supplied to each of the blocks in the wireless communication device 600. The power management circuit PMC controls the voltage of the internal power supply for each block supplied with the internal power supply. The power management circuit PMC performs the voltage control for the internal power supply based on instructions from the application processor 601. Further, the power management circuit PMC can control supplying and blocking of the internal power supply for each block. In addition, the power management circuit PMC also performs charging control for the battery 605 when supply from the external power supply is available.

The display unit 607 corresponds to the display device 502 shown in FIGS. 3A and 3B, and is a display device such as a liquid crystal display (LCD: Liquid Crystal Display), an organic EL display (OLED: Organic Light-Emitting Diode) and the like. The display unit 607 displays various images in accordance with processes performed by the application processor 601 and the GPU 613. The images displayed on the display unit 607 include user-interface images by which the user provides operation instructions to the wireless communication device 600, camera images, moving images and the like.

The camera unit 608 acquires an image in accordance with an instruction from the application processor 601. The camera unit 608 corresponds to the camera devices 505 and 506 in FIGS. 3A and 3B.

The operation input unit 609 is a user interface for the user to operate to provide an operation instruction to the wireless communication device 600. The operation input unit 609 corresponds to the touch panel 503 and the operation buttons 504 shown in FIGS. 3A and 3B.

The audio IC 610 converts reception voice data, which is a digital signal received from the baseband processor 602, into an analog signal, and drives the speaker 612. Thus voice is output from the speaker 612.

On the other hand, the audio IC 610 subjects voice, which is an analog signal detected by the microphone 611, to an analog-to-digital (A/D) conversion, and outputs the converted signal to the baseband processor 602. More specifically, the audio IC 610 generates PCM data, which is a digital signal, from voice which is an analog signal.

<Configuration of Semiconductor Device According to First Embodiment>

Figure 5:
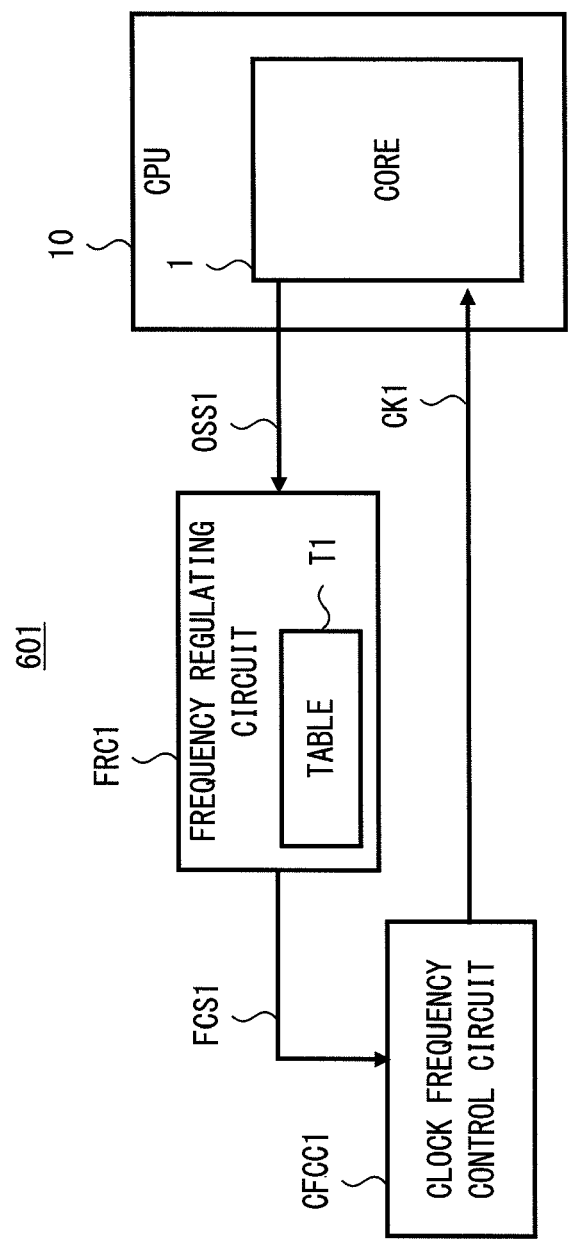
FIG. 5 is a block diagram of a semiconductor device according to the first embodiment.

Referring to FIG. 5, the configuration of the application processor 601, which is a semiconductor device according to the present embodiment, will be described. The application processor 601 is, for example, LSI (Large-Scale Integrated circuit). The application processor 601 includes a CPU 10, a frequency regulating circuit FRC1, and a clock frequency control circuit CFCC1. The CPU 10 includes a core 1. The frequency regulating circuit FRC1 includes a table T1. In the table T1, performance values of the core 1 and frequency values of a clock CK1 are associated with each other.

<Operation of Semiconductor Device According to First Embodiment>

Next, the operation of the application processor 601, which is a semiconductor device according to the present embodiment, will be described. The clock frequency control circuit CFCC1 provides a clock CK1 to the core 1 of the CPU 10. The core 1 performs a process on the basis of the clock CK1. The core 1 outputs an operating state signal OSS1 indicating the operating state of the core 1. The operating state signal OSS1 is a performance monitor signal indicating the performance of the core 1. The performance indicated by the operating state signal OSS1 may be an absolute value or a relative value with respect to the maximum performance of the core 1. The unit of performance is, for example, a million instructions per second (MIPS). The frequency regulating circuit FRC1 controls the frequency of the clock CK1 on the basis of the table T1 and the operating state signal OSS1. Specifically, the frequency regulating circuit FRC1 outputs a frequency control signal FCS1 on the basis of the table T1 and the operating state signal OSS1. The frequency control signal FCS1 indicates the set frequency of the clock CK1. The clock frequency control circuit CFCC1 controls the frequency of the clock CK1 on the basis of the frequency control signal FCS1.

Figure 6:
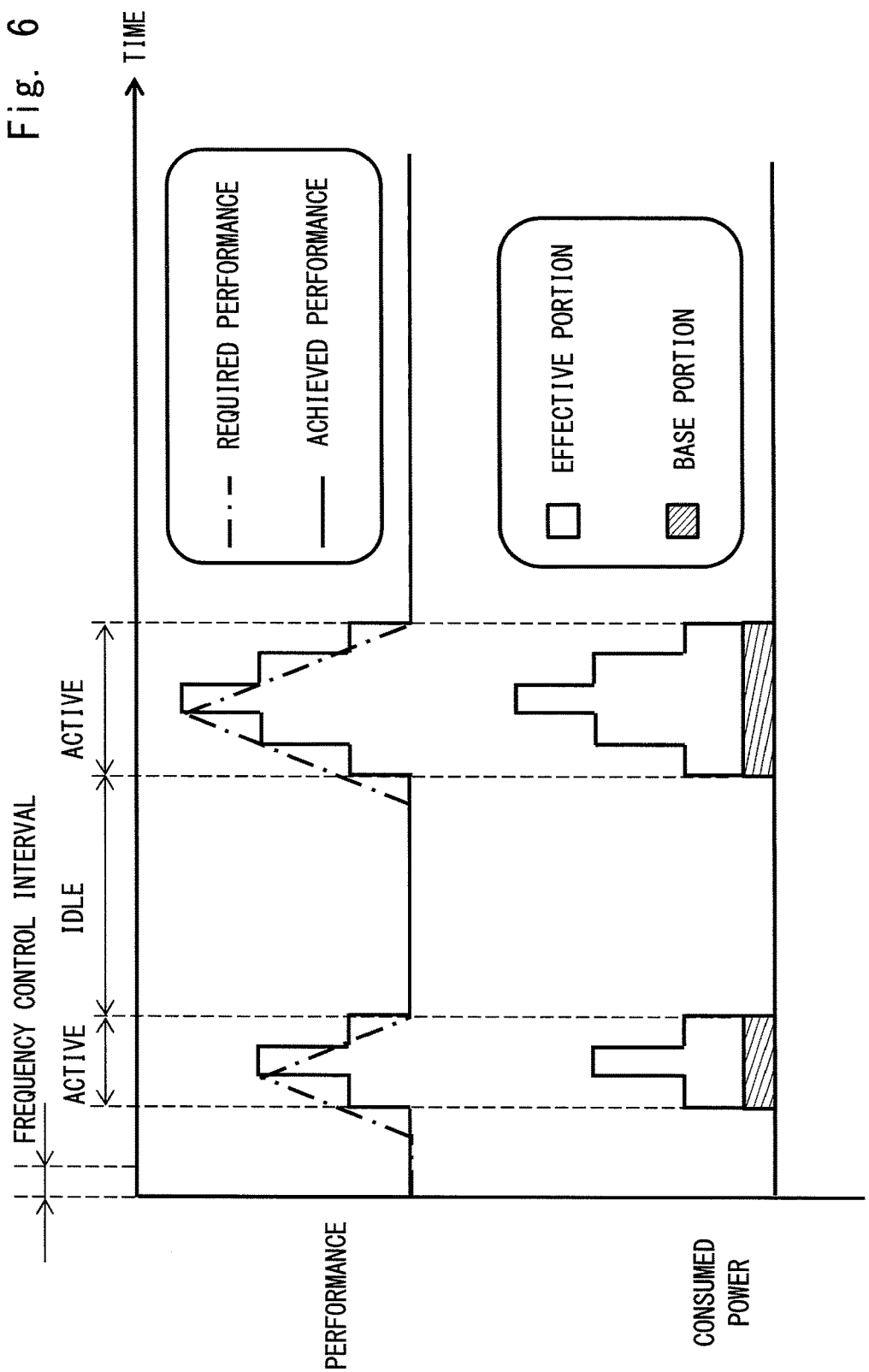
FIG. 6 is a conceptual diagram of a method for controlling the semiconductor device according to the first embodiment.

Referring to FIG. 6, the operation of the application processor 601, which is a semiconductor device according to the present embodiment, will be described in detail. The frequency regulating circuit FRC1 controls the frequency of the clock CK1 at regular frequency control intervals. Specifically, referring to the table T1, the frequency regulating circuit FRC1 determines a frequency corresponding to the performance of the core 1 indicated by the operating state signal OSS1. The frequency regulating circuit FRC1 then outputs a frequency control signal FCS1 indicating the determined frequency. Based on the frequency control signal FCS1, the clock frequency control circuit CFCC1 controls the frequency of the clock CK1. Since the frequency control interval according to the present embodiment is short, the performance achieved by the core 1 can follow the performance required of the core 1. The power consumed by the core 1 includes a base portion and an effective portion. The base portion is power which is required as long as the core 1 is placed in an active state. The effective portion is power which is required in accordance with the performance achieved by the core 1.

<Comparison Between Semiconductor Device According to First Embodiment and Semiconductor Device According to Comparative Example>

According to the present embodiment, the frequency regulating circuit FRC1 controls the frequency of the clock CK1 on the basis of the performance of the core 1 indicated by the operating state signal OSS1. For this reason, the frequency control interval can be shortened compared to that in the comparative example. Even when the required performance (load) dynamically changes, the achieved performance can follow the required performance. As a result, the active state of the core 1 is not extended. Therefore, expansion of the base portion of the power consumption of the core 1 is prevented, allowing a reduction in power consumption. Since the achieved performance can follow the dynamically changing required performance, the lower limit of the set frequency of the clock CK1 can be set to a low value.

According to the present embodiment, the frequency regulating circuit FRC1 serving as a dedicated circuit for controlling the frequency of the clock CK1 is provided. The frequency regulating circuit FRC1 includes the table T1. Thus the frequency regulating circuit FRC1 can control the frequency of the clock CK1 without depending on the OS. As a result, according to the present embodiment, no overhead occurs, unlike in the comparative example.

While the case where the application processor 601 includes the single CPU core 1 has been described, the application processor 601 may include a plurality of CPU cores 1. In this case, a frequency regulating circuit FRC1 and a clock frequency control circuit CFCC1 are provided for each CPU core 1.

<Detailed Description of Table Used in Clock Frequency Control According to First Embodiment>

Figure 7:
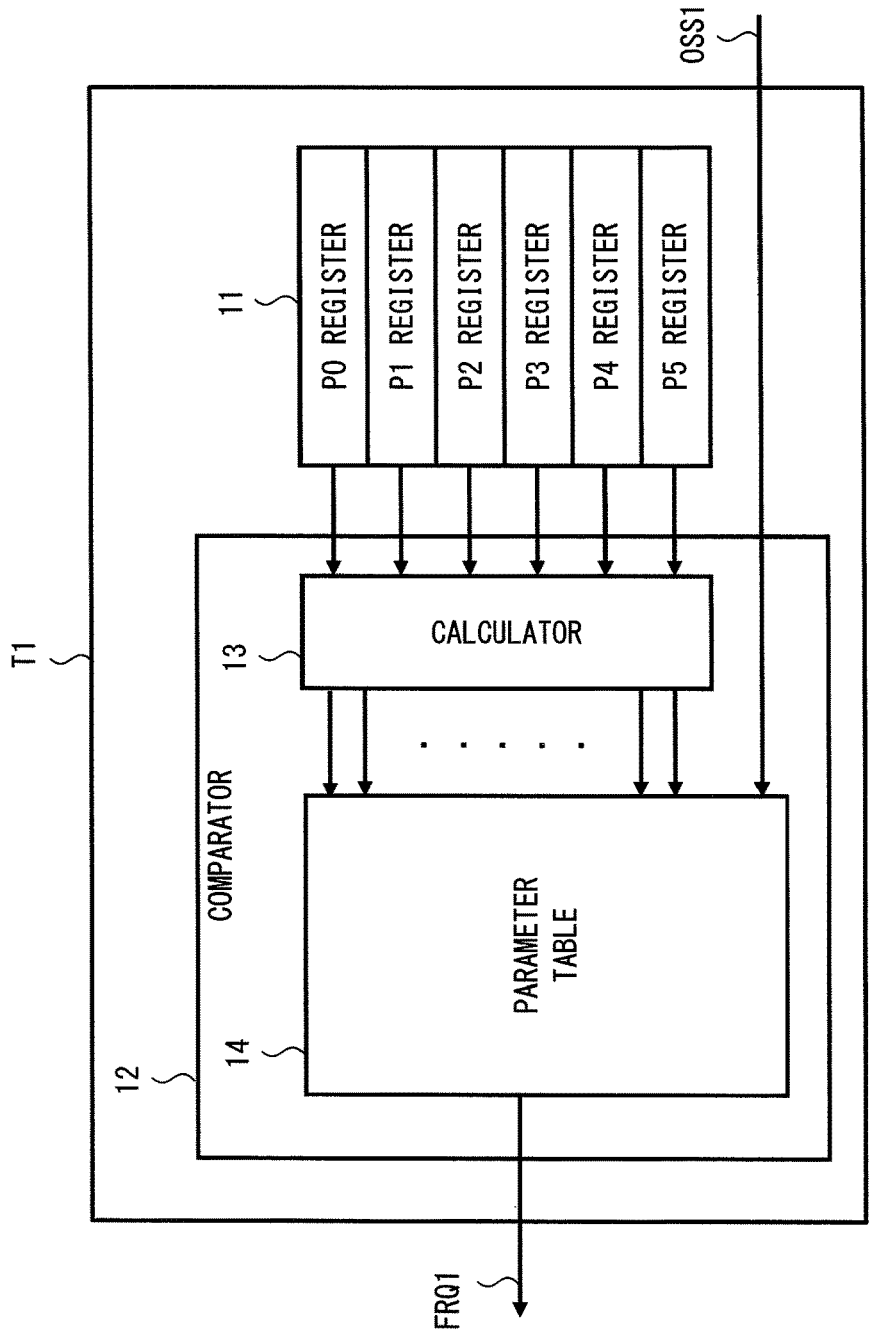
FIG. 7 is a block diagram of a table according to the first embodiment.

Referring to FIG. 7, the table T1 includes registers 11 and a comparator 12. The comparator 12 includes a calculator 13 and a parameter table 14.

Referring to FIG. 8, values stored in the registers 11 will be described. The registers 11 store, as points P0 to P5, combinations of performance values and frequency values. The performance values serve as first parameters; the frequency values serve as second parameters. Specifically, the registers 11 store point P0, which is a combination of a performance value "0" and a frequency value "10%", point P1, which is a combination of a performance value "10" and a frequency value "40%", point P2, which is a combination of a performance value "20" and a frequency value "65%", and point 3, which is a combination of a performance value "30" and a frequency value "80%". The registers 11 also store point 4, which is a combination of a performance value "50" and a frequency value "90%", and point P5, which is a combination of a performance value "85" and a frequency value "90%". While FIG. 8 shows a case where the performance values and frequency values are respectively relative values with respect to the maximum values, these values may be absolute values.

Based on points P0 to P5 stored in the registers 11, the calculator 13 calculates point P0-A which is interpolated between points P0 and P1, point P1-A which is interpolated between points P1 and P2, point P2-A which is interpolated between points P2 and P3, points P3-A to P3-C which are interpolated between points P3 and P4, and points P4-A to P4-D which are interpolated between points P4 and P5.

Referring to FIG. 9, the parameter table 14 stores points P0 to P5, P0-A, P1-A, P2-A, P3-A to P3-C, and P4-A to P4-D. Point P0-A is a combination of a performance value "5" and a frequency value "25%". Point P1-A is a combination of a performance value "15" and a frequency value "52%". Point P2-A is a combination of a performance value "25" and a frequency value "72%". Point P3-A is a combination of a performance value "35" and a frequency value "82%". Point P3-B is a combination of a performance value "40" and a frequency value "85%". Point P3-C is a combination of a performance value "45" and a frequency value "87%". Point P4-A is a combination of a performance value "55" and a frequency value "90%". Point P4-B is a combination of a performance value "60" and a frequency value "90%". Point P4-C is a combination of a performance value "65" and a frequency value "90%". Point P4-D is a combination of a performance value "70" and a frequency value "90%".

Figure 10:
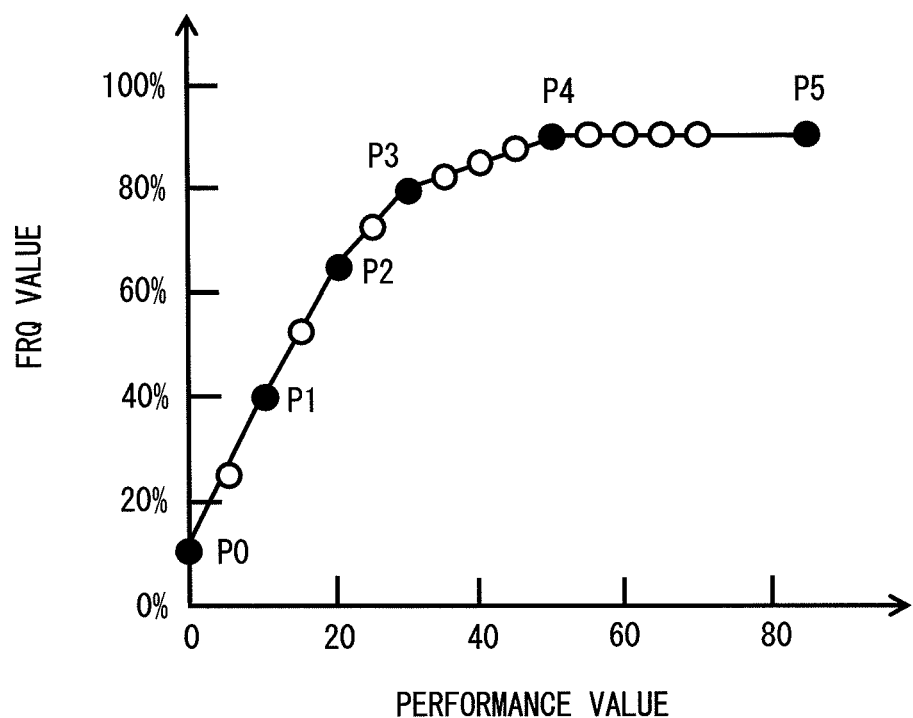
FIG. 10 is a graph showing an example of settings in the table according to the first embodiment.

FIG. 10 is a graph showing the correspondences between the performance values and the frequency values stored in the parameter table 14. Points P0 to P5 are represented by solid circles; points P0-A, P1-A, P2-A, P3-A to P3-C, and P4-A to P4-D are represented by open circles.

Referring to the parameter table 14, the comparator 12 determines a frequency value FRQ1 corresponding to the performance value of the core 1 indicated by the operating state signal OSS1. The frequency regulating circuit FRC1 outputs the frequency control signal FCS1 indicating the frequency value FRQ1.

Since the calculator 13 calculates interpolation points P0-A, P1-A, P2-A, P3-A to P3-C, and P4-A to P4-D on the basis of points P0 to P5 stored in the registers 11, the contents of the parameter table 14 can be changed by only changing the small number of points, P0 to P5, stored in the registers 11. For this reason, the contents of the parameter table 14 are easily changed in accordance with the situation in which the wireless communication terminal 600 is used. Since these points can be set freely, it is also possible to define a curved frequency trajectory.

<Example of settings in Tables According to First Embodiment>

Next, an example of settings in the table T1 according to the present embodiment will be described.

Figure 11A:
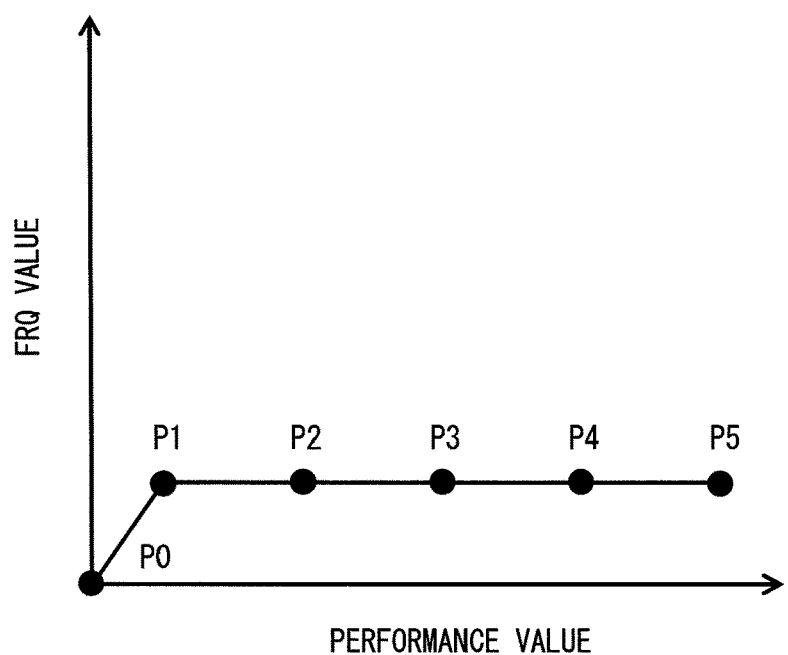
FIG. 11A is a graph showing another example of settings in the table according to the first embodiment.

FIG. 11A is a graph showing the contents of the parameter table 14 which conforms to music play mode. In the music play mode, the performance required of the CPU 10 is small. Accordingly, the frequency values of points P1 to P5 are set to a low value.

Figure 11B:
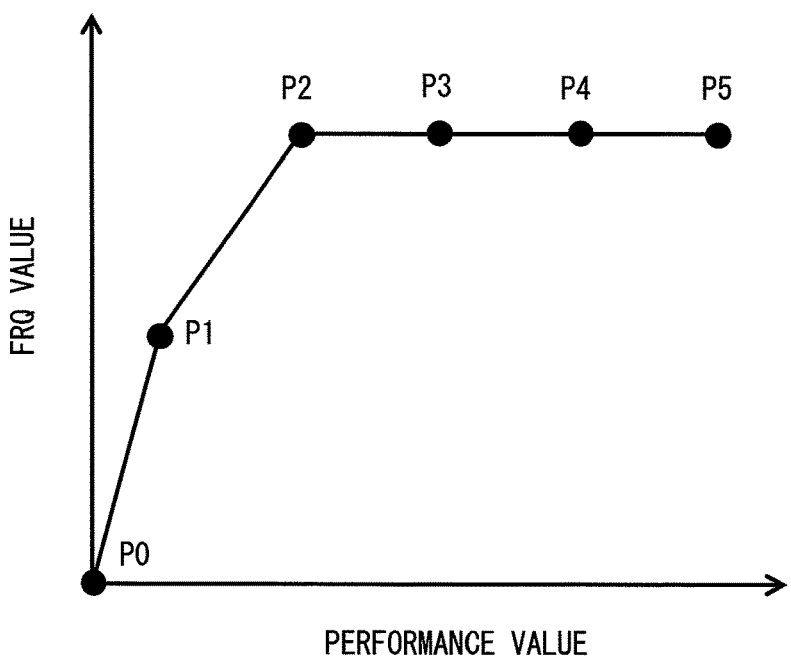
FIG. 11B is a graph showing another example of settings in the table according to the first embodiment.

FIG. 11B is a graph showing the contents of the parameter table 14 which conforms to a touch panel input operation mode. In the touch panel input operation mode, the frequency values steeply rise at points P0 to P2 in order to quickly respond to a touch operation on the touch panel 503 by the user.

Figure 11C:
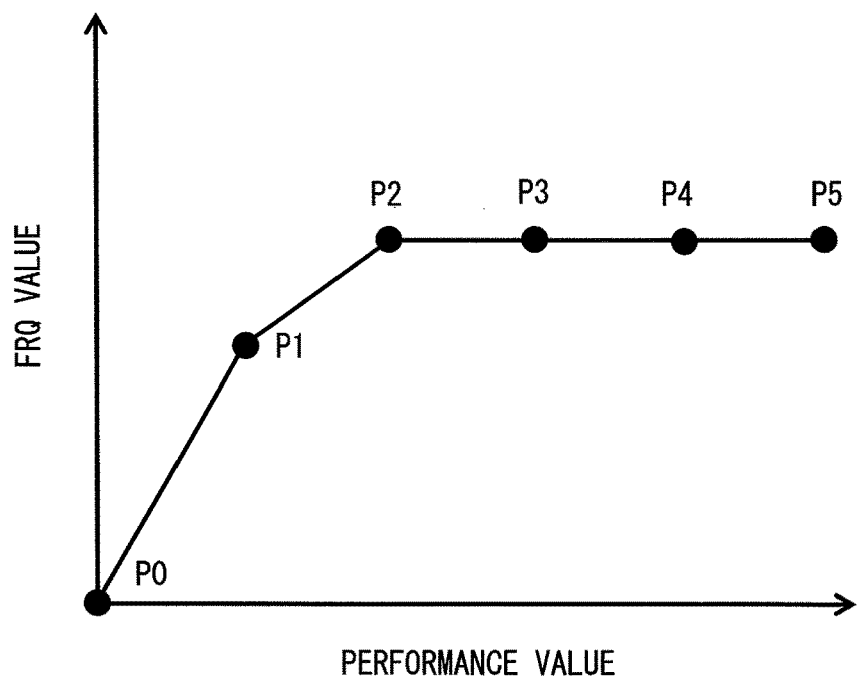
FIG. 11C is a graph showing another example of settings in the table according to the first embodiment.

FIG. 11C is a graph showing the contents of the parameter table 14 which conforms to a three dimensional (3D) graphics mode. In the 3D graphics mode, the frequency values of points P0 to P2 steeply rise in order to quickly respond to a request sent from the GPU 613 to the CPU 10. Note that in view of the electric current, the upper limit value of the frequency (the frequency values of points P2 to P5) is limited to a value lower than that in the touch panel input operation mode.

Figure 11D:
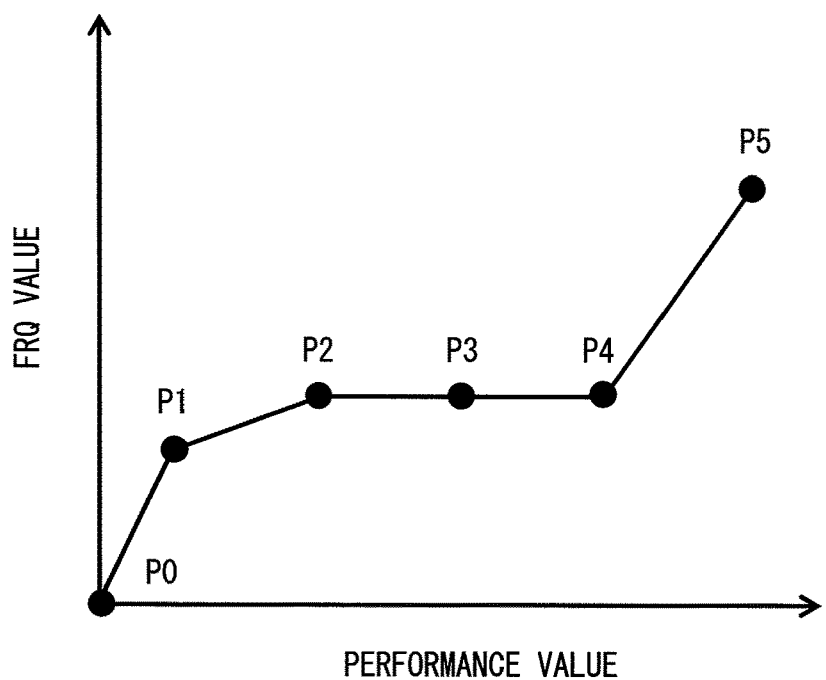
FIG. 11D is a graph showing another example of settings in the table according to the first embodiment.

FIG. 11D is a graph showing the contents of the parameter table 14 which conforms to a power saving mode. In the power saving mode, when the performance values are smaller than or equal to a certain threshold (the performance value of point P4), the frequency values are set to low values in order to reduce current consumption; when the performance values are higher than the threshold, the frequency values are set to high values.

<Modification of First Embodiment>

Next, a modification of the first embodiment will be described. In the present modification, an operating state signal OSS1 output by the core 1 indicates the idle state of the core 1. For this reason, the configuration and operation of a frequency regulating circuit FRC1 differ from those described above.

Figure 12:
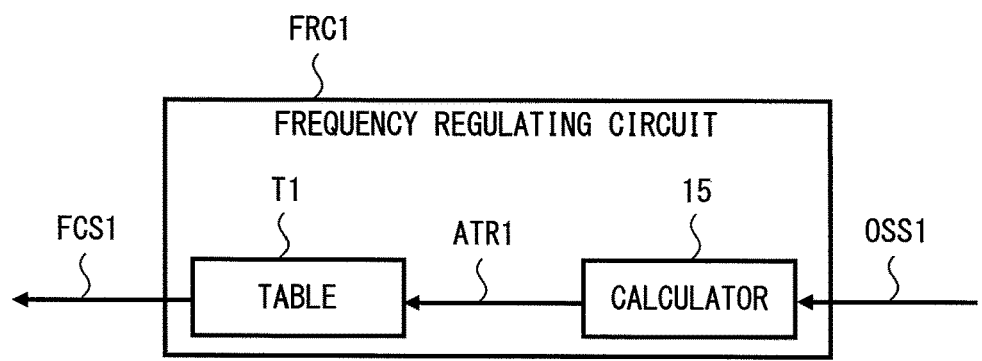
FIG. 12 is a block diagram of a frequency regulating circuit according to a modification of the first embodiment.

Referring to FIG. 12, a frequency regulating circuit FRC1 according to the present modification includes a table T1 and a calculator 15. The calculator 15 calculates an active time ratio ATR1 of the core 1 on the basis of the operating state signal OSS1 indicating the idle state of the core 1. The active time ratio ATR1 indicates an operating period per unit time of the core 1. The active time ratio ATR1 is, for example, the proportion of active state time in a frequency control interval. The frequency regulating circuit FRC1 outputs a frequency control signal FCS1 on the basis of the table T1 and the active time ratio ATR1.

Figure 13:
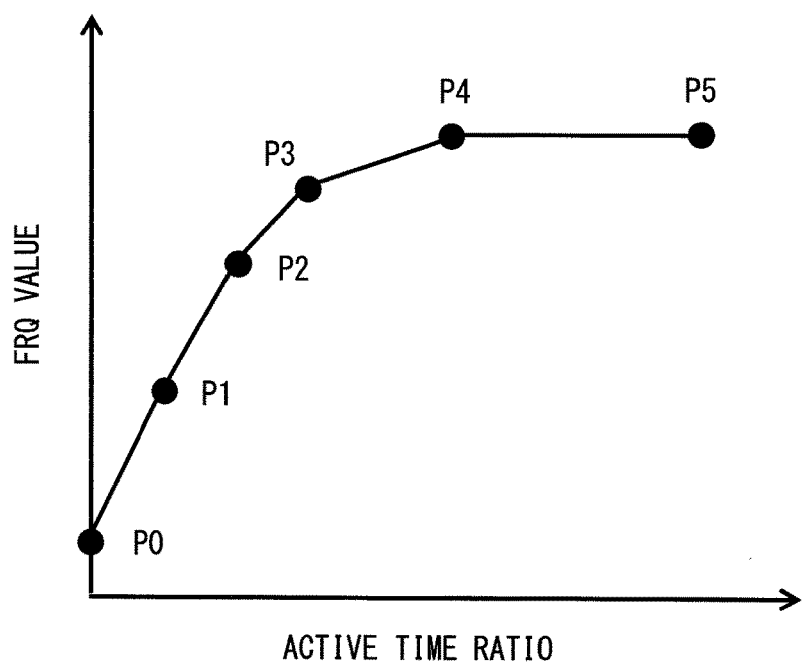
FIG. 13 is a graph showing an example of settings in a table according to the modification of the first embodiment.

Referring to FIG. 13, in the table T1 according to the present modification, active time ratios of the core 1 and frequency values of a clock CK1 are associated with each other. Note that in the table T1 according to the present modification, idle periods per unit time of the core 1 and frequency values may be associated with each other. An idle period per unit time of the core 1 is, for example, the proportion of idle time in a frequency control interval. In this case, the calculator 15 calculates idle time per unit time of the core 1 on the basis of the idle state of the core 1 indicated by the operating state signal OSS1. The frequency regulating circuit FRC1 outputs a frequency control signal FCS1 on the basis of the table T1 and the idle period per unit time of the core 1.

In the present modification, as also in the first embodiment, the frequency regulating circuit FRC1 serving as a dedicated circuit for controlling the frequency of the clock CK1 is provided. The frequency regulating circuit FRC1 includes the table T1. Accordingly, the frequency regulating circuit FRC1 can control the frequency of the clock CK1 without depending on the OS. As a result, according to the present modification, no overhead occurs, unlike in the comparative example. Since no overhead occurs, the frequency control interval can be shortened compared to that in the comparative example. Therefore, even if the required performance (load) dynamically changes, the achieved performance can follow the required performance. As a result, the active state of the core 1 is not extended. Since the active state of the core 1 is not extended, expansion of the base portion of the power consumption of the core 1 is prevented, allowing a reduction in power consumption. Note that if the operating state signal OSS1 indicates the performance of the core 1, the frequency control interval can be further shortened.

Second Embodiment

Next, an application processor 601, which is a semiconductor device according to a second embodiment, will be described. The application processor 601 according to the second embodiment includes a plurality of CPU cores.

Hereafter, descriptions of items which are common to the first embodiment may be omitted.

<Configuration of Semiconductor Device According to Second Embodiment>

Figure 14:
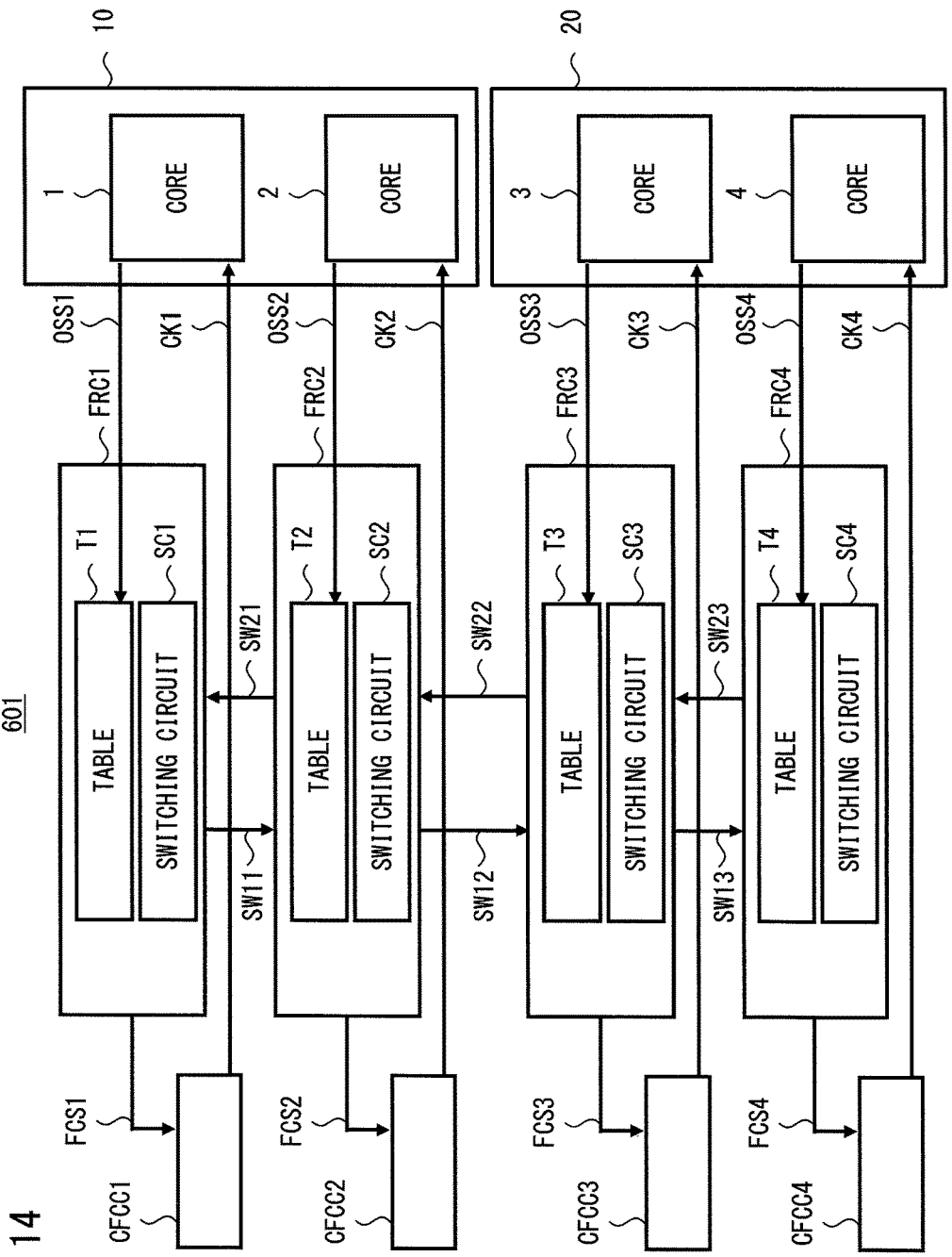
FIG. 14 is a block diagram of a semiconductor device according to a second embodiment.

Referring to FIG. 14, the configuration of the application processor 601, which is a semiconductor device according to the second embodiment, will be described. The application processor 601 includes CPUs 10 and 20. The CPU 10 is a power-saving CPU, which has a low operating frequency and low performance. The CPU 20 is a high-performance CPU, which has a high operating frequency and high performance. The CPU 10 includes cores 1 and 2. The CPU 20 includes cores 3 and 4. The cores 1 to 4 perform processes on the basis of clocks CK1 to CK4, respectively.

The application processor 601 includes frequency regulating circuits FRC1 to FRC4 and clock frequency control circuits CFCC1 to CFCC4. The frequency regulating circuit FRC1 includes a table T1 for controlling the frequency of the clock CK1 and a switching circuit SC1. In the table T1, performance values of the core 1 and frequency values of the clock CK1 are associated with each other. The frequency regulating circuit FRC2 includes a table T2 for controlling the frequency of the clock CK2 and a switching circuit SC2. In the table T2, performance values of the core 2 and frequency values of the clock CK2 are associated with each other. The frequency regulating circuit FRC3 includes a table T3 for controlling the frequency of the clock CK3 and a switching circuit SC3. In the table T3, performance values of the core 3 and frequency values of the clock CK3 are associated with each other. The frequency regulating circuit FRC4 includes a table T4 for controlling the frequency of the clock CK4 and a switching circuit SC4. In the table T4, performance values of the core 4 and frequency values of the clock CK4 are associated with each other.

The configurations of the tables T1 to T4 according to the present embodiment are the same as that of the table T1 according to the first embodiment. Points P0 to P5 are set in the respective tables T1 to T4 according to the present embodiment. Note that the correspondences between the performance values and the frequency values in the tables T1 to T4 according to the present embodiment are set as described below. The correspondences between the performance values and the frequency values vary among the CPU cores so as to reduce power consumption. The correspondences between the performance values and the frequency values preferably match the characteristics (power-saving type or high-performance type) of the cores 1 to 4 as control objects.

<Operation of Semiconductor Device According to Second Embodiment>

Next, the operation of the application processor 601, which is a semiconductor device according to the present embodiment, will be described.

The clock frequency control circuit CFCC1 provides the clock CK1 to the core 1 of the CPU 10. The core 1 performs a process based on the clock CK1. The core 1 outputs an operating state signal OSS1 indicating the operating state of the core 1. The operating state signal OSS1 is a performance monitor signal indicating the performance of the core 1. Based on the table T1 and the operating state signal OSS1, the frequency regulating circuit FRC1 controls the frequency of the clock CK1. Specifically, based on the table T1 and the operating state signal OSS1, the frequency regulating circuit FRC1 outputs a frequency control signal FCS1 indicating the set frequency of the clock CK1. Based on the frequency control signal FCS1, the clock frequency control circuit CFCC1 controls the frequency of the clock CK1. Based on the table T1 and the operating state signal OSS1, the switching circuit SC1 outputs a switching request SW11. Based on a switching request SW21, the frequency regulating circuit FRC1 makes a transition between the control states.

The clock frequency control circuit CFCC2 provides the clock CK2 to the core 2 of the CPU 10. The core 2 performs a process based on the clock CK2. The core 2 outputs an operating state signal OSS2 indicating the operating state of the core 2. The operating state signal OSS2 is a performance monitor signal indicating the performance of the core 2. Based on the table T2 and the operating state signal OSS2, the frequency regulating circuit FRC2 controls the frequency of the clock CK2. Specifically, based on the table T2 and the operating state signal OSS2, the frequency regulating circuit FRC2 outputs a frequency control signal FCS2 indicating the set frequency of the clock CK2. Based on the frequency control signal FCS2, the clock frequency control circuit CFCC2 controls the frequency of the clock CK2. Based on the table T2 and the operating state signal OSS2, the switching circuit SC2 outputs a switching request SW12 and a switching request SW21. Based on a switching request SW11 and a switching request SW22, the frequency regulating circuit FRC2 makes a transition between the control states.

The clock frequency control circuit CFCC3 provides the clock CK3 to the core 3 of the CPU 20. The core 3 performs a process based on the clock CK3. The core 3 outputs an operating state signal OSS3 indicating the operating state of the core 3. The operating state signal OSS3 is a performance monitor signal indicating the performance of the core 3. Based on the table T3 and the operating state signal OSS3, the frequency regulating circuit FRC3 controls the frequency of the clock CK3. Specifically, based on the table T3 and the operating state signal OSS3, the frequency regulating circuit FRC3 outputs a frequency control signal FCS3 indicating the set frequency of the clock CK3. Based on the frequency control signal FCS3, the clock frequency control circuit CFCC3 controls the frequency of the clock CK3. Based on the table T3 and the operating state signal OSS3, the switching circuit SC3 outputs a switching request SW13 and the switching request SW22. Based on the switching request SW12 and a switching request SW23, the frequency regulating circuit FRC3 makes a transition between the control states.

The clock frequency control circuit CFCC4 provides the clock CK4 to the core 4 of the CPU 20. The core 4 performs a process based on the clock CK4. The core 4 outputs an operating state signal OSS4 indicating the operating state of the core 4. The operating state signal OSS4 is a performance monitor signal indicating the performance of the core 4. Based on the table T4 and the operating state signal OSS4, the frequency regulating circuit FRC4 controls the frequency of the clock CK4. Specifically, based on the table T4 and the operating state signal OSS4, the frequency regulating circuit FRC4 outputs a frequency control signal FCS4 indicating the set frequency of the clock CK4. Based on the frequency control signal FCS4, the clock frequency control circuit CFCC4 controls the frequency of the clock CK4. Based on the table T4 and the operating state signal OSS4, the switching circuit SC4 outputs the switching request SW23. Based on the switching request SW13, the frequency regulating circuit FRC4 makes a transition between the control states.

Figure 15:
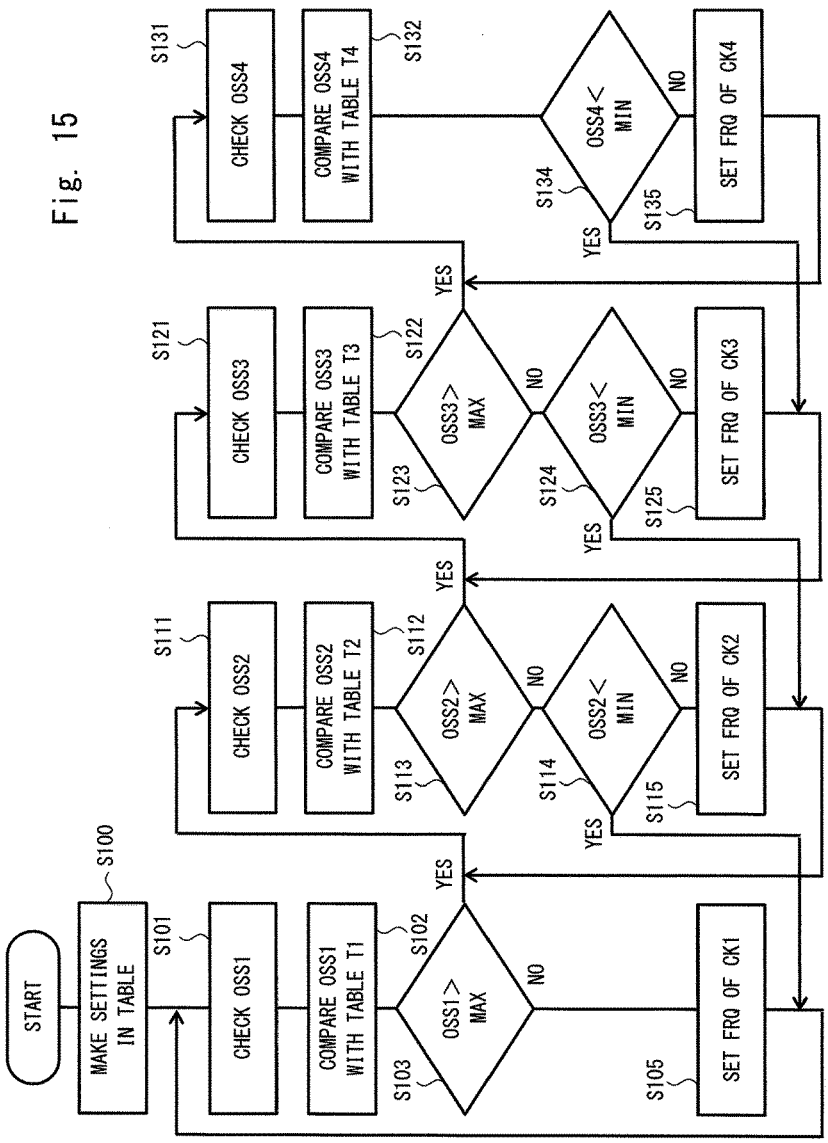
FIG. 15 is a flowchart of a method for controlling the semiconductor device according to the second embodiment.

Referring to FIG. 15, coordination among the clock controls for the cores 1 to 4 will be described. FIG. 15 is a flowchart of a method for controlling a semiconductor device according to the second embodiment. The method for controlling a semiconductor device includes steps S100 to S103, S105, S111 to S115, S121 to S125, S131, S132, S134, and S135.

In step S100, settings are made in the table T1. Specifically, the calculator 13 of the table T1 calculates interpolation points between points P0 to P5 stored in the registers 11 of the table T1. The parameter table 14 of the table T1 stores points P0 to P5 and the interpolation points. As in the table T1, settings are made in the tables T2 to T4.

The frequency regulating circuit FRC1 checks the performance value indicated by the operating state signal OSS1 (S101). The frequency regulating circuit FRC1 compares the performance value indicated by the operating state signal OSS1 with the table T1 (S102). If the performance value indicated by the operating state signal OSS1 is greater than the largest (the performance value of point P5) of the performance values in the table T1 (YES in S103), the process proceeds to step S111. If the performance value indicated by the operating state signal OSS1 is not greater than the largest of the performance values in the table 1 (NO in S103), the frequency regulating circuit FRC1 sets the frequency of the clock CK1 on the basis of the table T1 and the performance value indicated by the operating state signal OSS1 (S105). After step S105, the process returns to step S101.

The frequency regulating circuit FRC2 checks the performance value indicated by the operating state signal OSS2 (S111). The frequency regulating circuit FRC2 compares the performance value indicated by the operating state signal OSS2 with the table T2 (S112). If the performance value indicated by the operating state signal OSS2 is greater than the largest (the performance value of point P5) of the performance values in the table T2 (YES in S113), the process proceeds to step S121. If the performance value indicated by the operating state signal OSS2 is not greater than the largest of the performance values in the table T2 (NO in S113), the process proceeds to step S114. If the performance value indicated by the operating state signal OSS2 is smaller than the smallest (the performance value of point P0) of the performance values in the table T2 (YES in S114), the process returns to step S101. If the performance value indicated by the operating state signal OSS2 is not smaller than the smallest of the performance values in the table T2 (NO in S114), the frequency regulating circuit FRC2 sets the frequency of the clock CK2 on the basis of the table T2 and the performance value indicated by the operating state signal OSS2 (S115). After step S115, the process returns to step S111.

The frequency regulating circuit FRC3 checks the performance value indicated by the operating state signal OSS3 (S121). The frequency regulating circuit FRC3 compares the performance value indicated by the operating state signal OSS3 with the table T3 (S122). If the performance value indicated by the operating state signal OSS3 is greater than the largest (the performance value of point P5) of the performance values in the table T3 (YES in S123), the process proceeds to step S131. If the performance value indicated by the operating state signal OSS3 is not greater than the largest of the performance values in the table T3 (NO in S123), the process proceeds to step S124. If the performance value indicated by the operating state signal OSS3 is smaller than the smallest (the performance value of point P0) of the performance values in the table T3 (YES in S124), the process returns to step S111. If the performance value indicated by the operating state signal OSS3 is not smaller than the smallest of the performance values in the table T3 (NO in S124), the frequency regulating circuit FRC3 sets the frequency of the clock CK3 on the basis of the table T3 and the performance value indicated by the operating state signal OSS3 (S125). After step S125, the process returns to step S121.

The frequency regulating circuit FRC4 checks the performance value indicated by the operating state signal OSS4 (S131). The frequency regulating circuit FRC4 compares the performance value indicated by the operating state signal OSS4 with the table T4 (S132). If the performance value indicated by the operating state signal OSS4 is smaller than the smallest (the performance value of point P0) of the performance values in the table T4 (YES in S134), the process returns to step S121. If the performance value indicated by the operating state signal OSS4 is not smaller than the smallest of the performance values in the table T4 (NO in S134), the frequency regulating circuit FRC4 sets the frequency of the clock CK4 on the basis of the table T4 and the performance value indicated by the operating state signal OSS4 (S135). After step S135, the process returns to step S131.

Referring to FIGS. 16A to 16D, the coordination among the clock controls for the cores 1 to 4 will be further described.

Figure 16A:
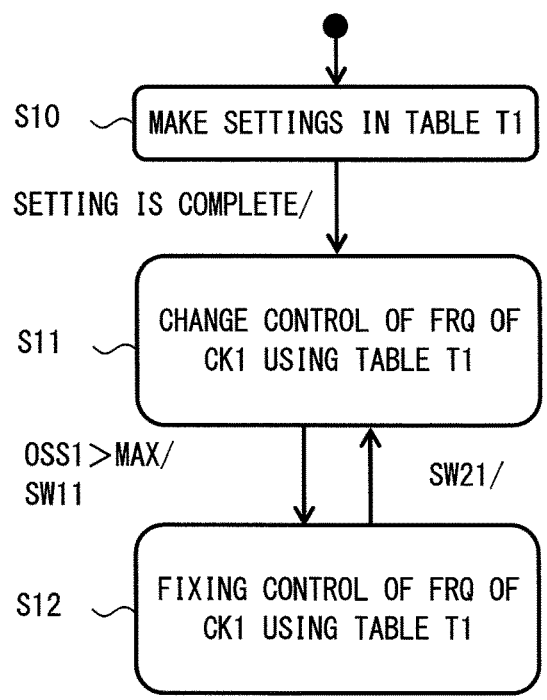
FIG. 16A is a state transition diagram of a first frequency regulating circuit according to the second embodiment.

FIG. 16A is a state transition diagram of the frequency regulating circuit FRC1. The frequency regulating circuit FRC1 can be placed in states S10, S11, and S12. In the initial state, S10, the frequency regulating circuit FRC1 makes settings in the table T1, as described in step S100. When the settings are completed, the frequency regulating circuit FRC1 makes a transition from state S10 to state S11.

In state S11, the frequency regulating circuit FRC1 repeatedly performs steps S101 to S105 to control the frequency of the clock CK1 on the basis of the table T1 and the operating state signal OSS1. In state S11, the frequency of the clock CK1 changes in accordance with a change in the performance value indicated by the operating state signal OSS1. When the load on the application processor 601 is increased, the performance value indicated by the operating state signal OSS1 is increased as well. When the performance value indicated by the operating state signal OSS1 is greater than the largest of the performance values in the table T1 (the performance value of point P5, which is the upper limit setting), it can be judged that the load has been increased to the extent that the core 1 alone cannot process the load. Therefore, when the frequency regulating circuit FRC1 detects that the performance value indicated by the operating state signal OSS1 is greater than the largest of the performance values in the table T1 (YES in S103), the frequency regulating circuit FRC1 outputs the switching request SW11 to the frequency regulating circuit FRC2 and makes a transition from state S11 to state S12.

In state S12, the frequency regulating circuit FRC1 fixes the frequency of the clock CK1 to the largest frequency value in the table T1 (the frequency value of point P5). When the frequency regulating circuit FRC1 receives the switching request SW21 from the frequency regulating circuit FRC2, the frequency regulating circuit FRC1 makes a transition from state S12 to state S11.

Figure 16B:
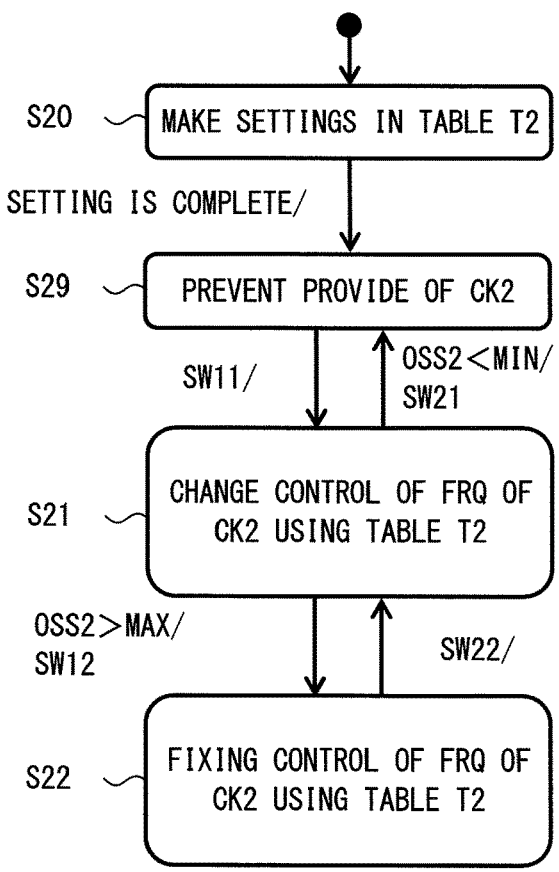
FIG. 16B is a state transition diagram of a second frequency regulating circuit according to the second embodiment.

FIG. 16B is a state transition diagram of the frequency regulating circuit FRC2. The frequency regulating circuit FRC2 can be placed in states S20, S29, S21, and S22. In the initial state, S20, the frequency regulating circuit FRC2 makes settings in the table T2, as described in step S100. When the settings are completed, the frequency regulating circuit FRC2 makes a transition from state S20 to state S29. In state S29, the frequency regulating circuit FRC2 prevents the clock frequency control circuit CFCC2 from providing the clock CK2. When the frequency regulating circuit FRC2 receives the switching request SW11 from the frequency regulating circuit FRC1, the frequency regulating circuit FRC2 causes the clock frequency control circuit CFCC2 to start providing the clock CK2 to the core 2 and makes a transition from state S29 to state S21.

In state S21, the frequency regulating circuit FRC2 repeatedly performs steps S111 to S115 to control the frequency of the clock CK2 on the basis of the table T2 and the operating state signal OSS2. In state S21, the frequency of the clock CK2 changes in accordance with a change in the performance value indicated by the operating state signal OSS2. When the load on the application processor 601 is increased, the performance value indicated by the operating state signal OSS2 is increased as well. When the performance value indicated by the operating state signal OSS2 is greater than the largest of the performance values in the table T2 (the performance value of point P5, which is the upper limit setting), it can be judged that the load has been increased to the extent that the cores 1 and 2 alone cannot process the load. Therefore, when the frequency regulating circuit FRC2 detects that the performance value indicated by the operating state signal OSS2 is greater than the largest of the performance values in the table T2 (YES in S113), the frequency regulating circuit FRC2 outputs the switching request SW12 to the frequency regulating circuit FRC3 and makes a transition from state S21 to state S22.

In contrast, when the load on the application processor 601 is reduced, the performance value indicated by the operating state signal OSS2 is reduced as well. When the performance value indicated by the operating state signal OSS2 is smaller than the smallest of the performance values in the table T2 (the performance value of point P0, which is the lower limit setting), it can be judged that the load has been reduced to the extent that the core 1 alone can process the load. Therefore, when the frequency regulating circuit FRC2 detects that the performance value indicated by the operating state signal OSS2 is smaller than the smallest of the performance values in the table T2 (YES in S114), the frequency regulating circuit FRC2 outputs the switching request SW21 to the frequency regulating circuit FRC1 and makes a transition from state S21 to state S29.

In state S22, the frequency regulating circuit FRC2 fixes the frequency of the clock CK2 to the largest frequency value in the table T2 (the frequency value of point P5). When the frequency regulating circuit FRC2 receives the switching request SW22 from the frequency regulating circuit FRC3, the frequency regulating circuit FRC2 makes a transition from state S22 to state S21.

Figure 16C:
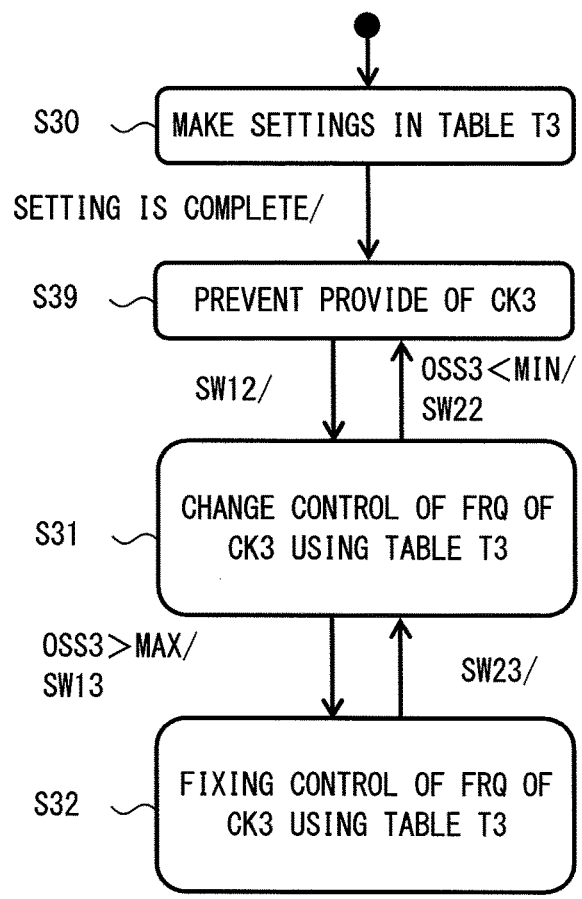
FIG. 16C is a state transition diagram of a third frequency regulating circuit according to the second embodiment.

FIG. 16C is a state transition diagram of the frequency regulating circuit FRC3. The frequency regulating circuit FRC3 can be placed in states S30, S39, S31, and S32. In the initial state, S30, the frequency regulating circuit FRC3 makes settings in the table T3, as described in step S100. When the settings are completed, the frequency regulating circuit FRC3 makes a transition from state S30 to state S39. In state S39, the frequency regulating circuit FRC3 prevents the clock frequency control circuit CFCC3 from providing the clock CK3. When the frequency regulating circuit FRC3 receives the switching request SW12 from the frequency regulating circuit FRC2, the frequency regulating circuit FRC3 causes the clock frequency control circuit CFCC3 to start providing the clock CK3 to the core 3 and makes a transition from state S39 to state S31.

In state S31, the frequency regulating circuit FRC3 repeatedly performs steps S121 to S125 to control the frequency of the clock CK3 on the basis of the table T3 and the operating state signal OSS3. In state S31, the frequency of the clock CK3 changes in accordance with a change in the performance value indicated by the operating state signal OSS3. When the load on the application processor 601 is increased, the performance value indicated by the operating state signal OSS3 is increased as well. When the performance value indicated by the operating state signal OSS3 is greater than the largest of the performance values in the table T3 (the performance value of point P5, which is the upper limit setting), it can be judged that the load has been increased to the extent that the cores 1 to 3 alone cannot process the load. Therefore, when the frequency regulating circuit FRC3 detects that the performance value indicated by the operating state signal OSS3 is greater than the largest of the performance values in the table T3 (YES in S123), the frequency regulating circuit FRC3 outputs the switching request SW13 to the frequency regulating circuit FRC4 and makes a transition from state S31 to state S32.

In contrast, when the load on the application processor 601 is reduced, the performance value indicated by the operating state signal OSS3 is reduced as well. When the performance value indicated by the operating state signal OSS3 is smaller than the smallest of the performance values in the table T3 (the performance value of point P0, which is the lower limit setting), it can be judged that the load has been reduced to the extent that the cores 1 and 2 alone can process the load. Therefore, when the frequency regulating circuit FRC3 detects that the performance value indicated by the operating state signal OSS3 is smaller than the smallest of the performance values in the table T3 (YES in S124), the frequency regulating circuit FRC3 outputs the switching request SW22 to the frequency regulating circuit FRC2 and makes a transition from state S31 to state S39.

In state S32, the frequency regulating circuit FRC3 fixes the frequency of the clock CK3 to the largest frequency value in the table T3 (the frequency value of point P5). When the frequency regulating circuit FRC3 receives the switching request SW23 from the frequency regulating circuit FRC4, the frequency regulating circuit FRC3 makes a transition from state S32 to state S31.

Figure 16D:
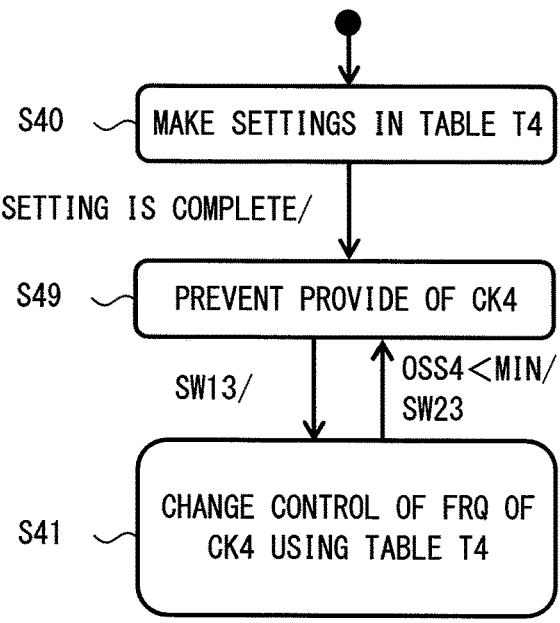
FIG. 16D is a state transition diagram of a fourth frequency regulating circuit according to the second embodiment.

FIG. 16D is a state transition diagram of the frequency regulating circuit FRC4. The frequency regulating circuit FRC4 can be placed in states S40, S49, and S41. In the initial state, S40, the frequency regulating circuit FRC4 makes settings in the table T4, as described in step S100. When the settings are completed, the frequency regulating circuit FRC4 makes a transition from state S40 to state S49. In state S49, the frequency regulating circuit FRC4 prevents the clock frequency control circuit CFCC4 from providing the clock CK4. When receiving the switching request SW13 from the frequency regulating circuit FRC3, the frequency regulating circuit FRC4 causes the clock frequency control circuit CFCC4 to start providing the clock CK4 to the core 4 and makes a transition from state S49 to state S41.

In state S41, the frequency regulating circuit FRC4 repeatedly performs steps S131 to S135 to control the frequency of the clock CK4 on the basis of the table T4 and the operating state signal OSS4. In state S41, the frequency of the clock CK4 changes in accordance with a change in the performance value indicated by the operating state signal OSS4. When the load on the application processor 601 is reduced, the performance value indicated by the operating state signal OSS4 is reduced as well. When the performance value indicated by the operating state signal OSS4 is smaller than the smallest of the performance values in the table T4 (the performance value of point P0, which is the lower limit setting), it can be judged that the load has been reduced to the extent that the cores 1 to 3 alone can process the load. Therefore, when the frequency regulating circuit FRC4 detects that the performance value indicated by the operating state signal OSS4 is smaller than the smallest of the performance values in the table T4 (YES in S134), the frequency regulating circuit FRC4 outputs the switching request SW23 to the frequency regulating circuit FRC3 and makes a transition from state S41 to state S49.

<Example of settings in Tables According to Second Embodiment>

Next, an example of settings in the tables T1 to T4 according to the present embodiment will be described.

Figure 17A:
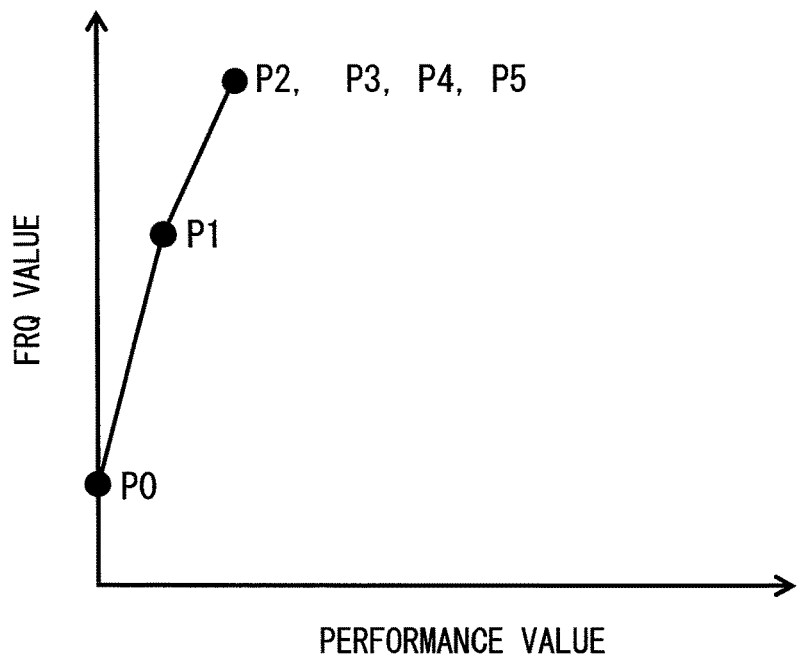
FIG. 17A is a graph showing an example of settings in a first table according to the second embodiment.

FIG. 17A is a graph showing the correspondences between the performance values and frequency values set in the table T1. Points P0 to P5 are represented by solid circles. To allow the power-saving type core 1 alone to process a light load, settings are made in the table T1 so that the frequency of the clock CK1 is easily increased.

Figure 17B:
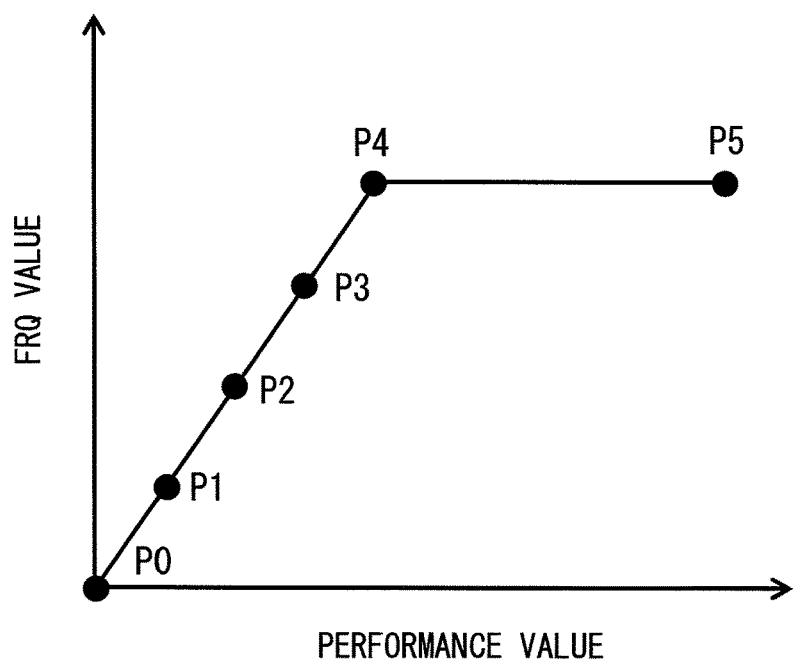
FIG. 17B is a graph showing an example of settings in a second table according to the second embodiment.

FIG. 17B is a graph showing the correspondences between the performance values and frequency values in the table T2. Points P0 to P5 are represented by solid circles. In the section from point P0 to point P4, the frequency value is linearly increased in accordance with increases in the performance value. As seen above, settings are made in the table T2 so that the frequency of the clock CK2 is easily increased. Note that to allow the power-saving type cores 1 and 2 alone to process the load as much as possible, the performance value of point P5 is set to a large value, and thus occurrence of the switching request SW12 is reduced.

Figure 17C:
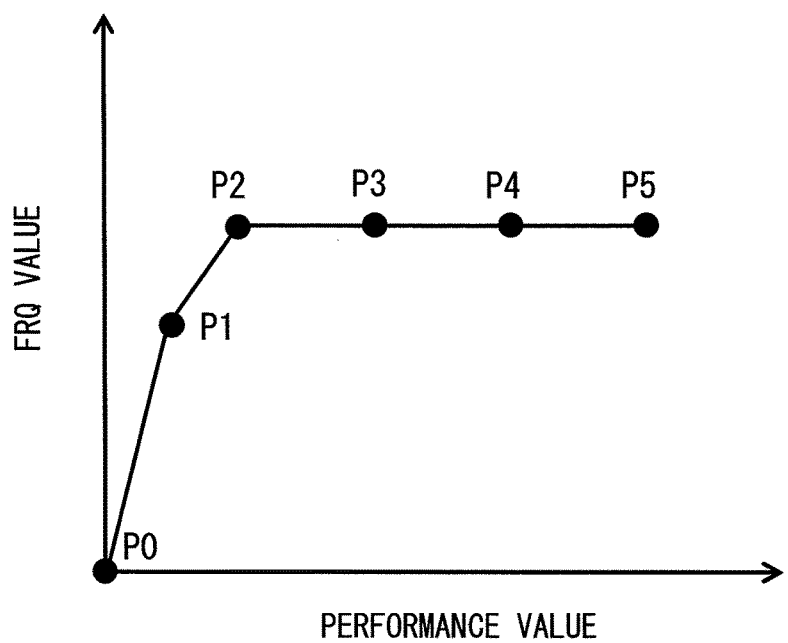
FIG. 17C is a graph showing an example of settings in a third table according to the second embodiment.

FIG. 17C is a graph showing the correspondences between the performance values and frequency values set in the table T3. Points P0 to P5 are represented by solid circles. To allow the high-performance, power-consuming core 3 and the power-saving type cores 1 and 2 alone to process the load, the upper limit of the set frequency of the clock CK3 (the frequency values of points P2 to P5) is limited, and thus occurrence of the switching request SW13 is reduced.

Figure 17D:
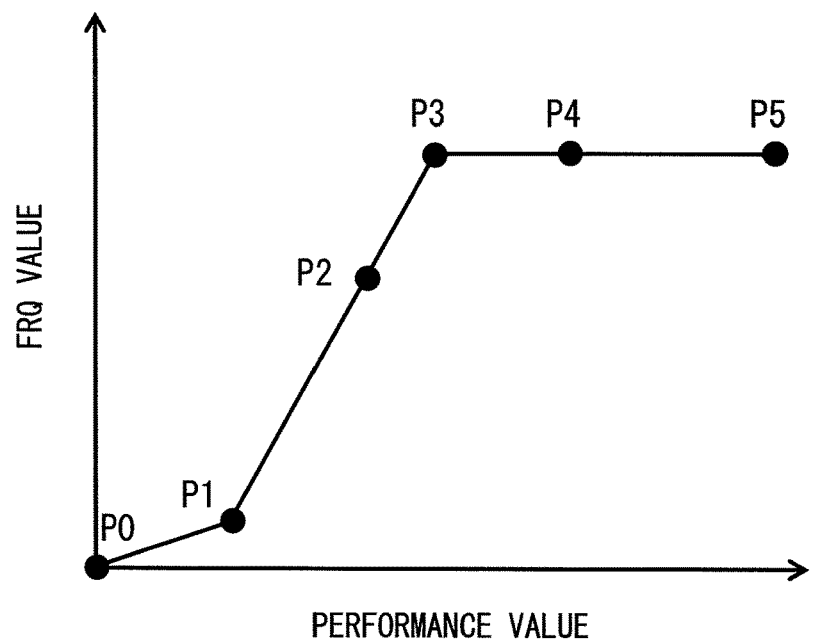
FIG. 17D is a graph showing an example of settings in a fourth table according to the second embodiment.

FIG. 17D is a graph showing the correspondences between the performance values and frequency values set in the table T4. Points P0 to P5 are represented by solid circles. To reduce the operating time of the core 4 as much as possible, settings are made in the table T4 such that the frequency of the clock CK4 is easily increased.

As seen above, clock frequency control which is intended to reduce power consumption can be performed for the CPUs 10 and 20, which differ from each other in characteristics.

In the present embodiment, the operating state signals OSS1 to OSS4 may indicate the idle states of the cores 1 to 4, respectively. In this case, the frequency regulating circuits FRC1 to FRC4 output frequency control signals FCS1 to FCS4, respectively, through processes the same as that of the frequency regulating circuit FRC1 according to the modification of the first embodiment.

According to the present embodiment, clock controls for the cores 1 to 4 can be coordinated. In other words, the number of CPU cores, which perform processes, can be increased and reduced in accordance with a change in the load on the application processor 601. As a result, the performance of the entire application processor 601 can satisfactorily follow the dynamically changing load. Further, even when CPU cores are added to the application processor 601, it is only necessary to add frequency regulating circuits and clock frequency control circuits corresponding to the added CPU cores. That is, the application processor 601, which is a semiconductor device according to the present embodiment, has good expandability. Further, the division of roles between the power-saving type cores 1 and 2 and the high-performance type cores 3 and 4 is optimized. Thus, while allowing the performance of the entire application processor 601 to satisfactorily follow the dynamically changing load, the power consumption of the entire application processor 601 can be reduced.

Figure 18:
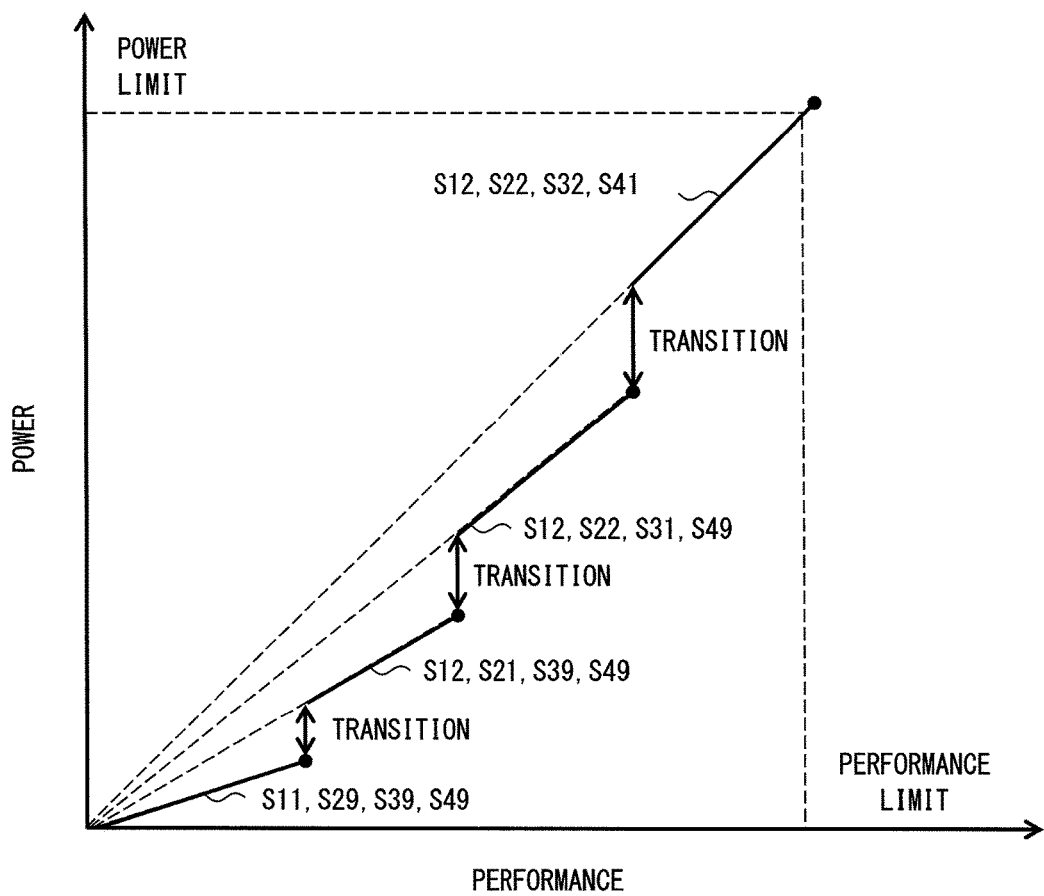
FIG. 18 is a graph showing the relationship between performance and power of the semiconductor device according to the second embodiment.

Referring to FIG. 18, other technical advantages of the present embodiment will be described. FIG. 18 is a graph showing the relationship between the performance and the power of the entire application processor 601, which is a semiconductor device according to the present embodiment. FIG. 18 shows a processing mode corresponding to states S11, S29, S39, and S49, a processing mode corresponding to states S12, S21, S39, and S49, a processing mode corresponding to states S12, S22, S31, and S49, a processing mode corresponding to states S12, S22, S32, and S41, and transitions between the processing modes. If there is a power limit serving as the current limit of the entire application processor 601, it is possible to set a performance limit corresponding to the power limit in the table and thus to prevent the clock frequency from being increased to frequencies greater than or equal to a frequency value corresponding to the performance limit. Thus it is possible to numerically define the upper limit current of the entire application processor 601, which is usually difficult to define.

Third Embodiment

Next, an application processor 601, which is a semiconductor device according to a third embodiment, will be described. In the third embodiment, the operating voltage of cores 3 and 4 of the CPU 20 is additionally controlled. Hereafter, descriptions of items which are common to the second embodiments may be omitted.

<Configuration of Semiconductor Device According to Third Embodiment>

Referring to FIG. 19, the configuration of the application processor 601, which is a semiconductor device according to the third embodiment, will be described. The application processor 601 includes CPUs 10 and 20. The configurations of the CPUs 10 and 20 are the same as those in the second embodiment.

The application processor 601 includes frequency regulating circuits FRC1 to FRC4 and clock frequency control circuits CFCC1 to CFCC4. The configurations of the frequency regulating circuits FRC1 and FRC2 are the same as those in the second embodiment. The configurations of the clock frequency control circuits CFCC1 to CFCC4 are the same as those in the second embodiment. On the other hand, the configurations of the frequency regulating circuits FRC3 and FRC4 differ from those in the second embodiment. The power management circuit PMC includes a power management unit 5 for providing an operating voltage to the core 3 and a power management unit 6 for providing an operating voltage to the core 4.

Figure 20A:
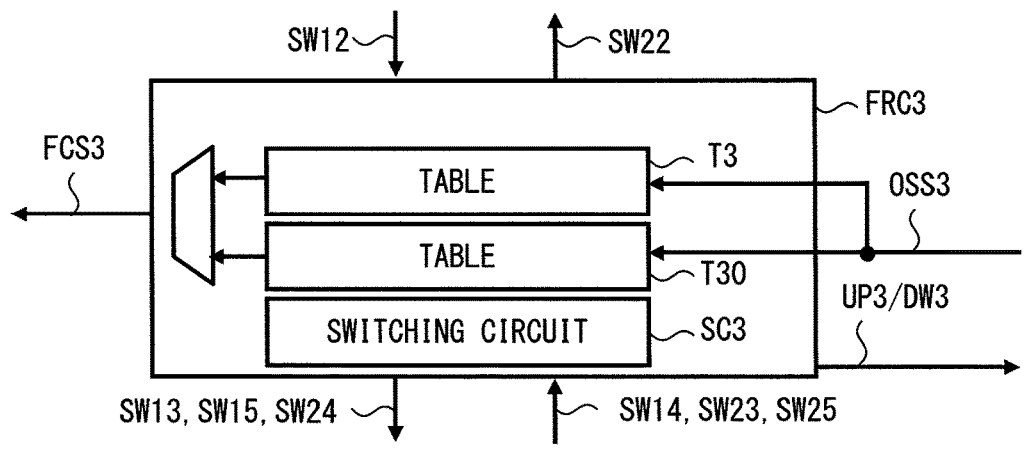
FIG. 20A is a block diagram of a third frequency regulating circuit according to the third embodiment.

Referring to FIG. 20A, the configuration of the frequency regulating circuit FRC3 will be described. The frequency regulating circuit FRC3 includes tables T3 and T30 for controlling the frequency of a clock CK3 and a switching circuit SC3. In the tables T3 and T30, performance values of the core 3 and frequency values of the clock CK3 are associated with each other. The correspondences between the performance values and the frequency values in the table T3 differ from those in the table T30. The table T3 corresponds to a normal voltage NV (to be described later); the table T30 corresponds to an overdrive voltage ODV (to be described later).

Figure 20B:
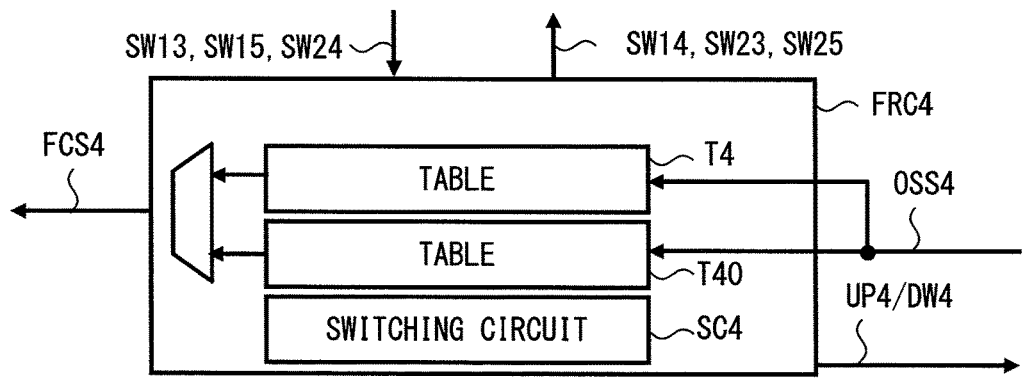
FIG. 20B is a block diagram of a fourth frequency regulating circuit according to the third embodiment.

Referring to FIG. 20B, the configuration of the frequency regulating circuit FRC4 will be described. The frequency regulating circuit FRC4 includes tables T4 and T40 for controlling the frequency of a clock CK4 and a switching circuit SC4. In the tables T4 and T40, performance values of the core 4 and frequency values of the clock CK4 are associated with each other. The correspondences between the performance values and the frequency values in the table T4 differ from those in the table T40. The table T4 corresponds to a normal voltage NV (to be described later); the table T40 corresponds to an overdrive voltage ODV (to be described later).

<Operation of Semiconductor Device According to Third Embodiment>

Next, the operation of the application processor 601, which is a semiconductor device according to the present embodiment, will be described.

The operations of the CPU 10, the frequency regulating circuits FRC1 and FRC2, and clock frequency control circuits CFCC1 and CFCC2 are the same as those in the second embodiment.

Referring to FIGS. 19 and 20A, the clock frequency control circuit CFCC3 provides the clock CK3 to the core 3 of the CPU 20. The core 3 performs a process based on the clock CK3. The core 3 outputs an operating state signal OSS3 indicating the operating state of the core 3. The operating state signal OSS3 is a performance monitor signal indicating the performance of the core 3. In one control state, the frequency regulating circuit FRC controls the frequency of the clock CK3 on the basis of the table T3 and the operating state signal OSS3. Specifically, the frequency regulating circuit FRC3 outputs a frequency control signal FCS3 on the basis of the table T3 and the operating state signal OSS3. In the other control state, the frequency regulating circuit FRC3 controls the frequency of the clock CK3 on the basis of the table T30 and the operating state signal OSS3. Specifically, the frequency regulating circuit FRC3 outputs a frequency control signal FCS3 on the basis of the table T30 and the operating state signal OSS3. The frequency control signal FCS3 indicates the set frequency of the clock CK3. Based on the frequency control signal FCS3, the clock frequency control circuit CFCC3 controls the frequency of the clock CK3. Based on the table T3 and the operating state signal OSS3, the switching circuit SC3 outputs switching requests SW13 and SW22. Also, based on the table T30 and the operating state signal OSS3, the switching circuit SC3 outputs switching requests SW15 and SW24 and a voltage reduction request DW3. Based on switching requests SW12, SW23, and SW25, the frequency regulating circuit FRC3 makes a transition between the control states. Also, based on a switching request SW14, the frequency regulating circuit FRC3 makes a transition between the control states, and outputs a voltage increase request UP3.

Referring to FIGS. 19 and 20B, the clock frequency control circuit CFCC4 provides the clock CK4 to the core 4 of the CPU 20. The core 4 performs a process based on the clock CK4. The core 4 outputs an operating state signal OSS4 indicating the operating state of the core 4. The operating state signal OSS4 is a performance monitor signal indicating the performance of the core 4. In one control state, the frequency regulating circuit FRC4 controls the frequency of the clock CK4 on the basis of the table T4 and the operating state signal OSS4. Specifically, the frequency regulating circuit FRC4 outputs a frequency control signal FCS4 on the basis of the table T4 and the operating state signal OSS4. In the other control state, the frequency regulating circuit FRC4 controls the frequency of the clock CK4 on the basis of the table T40 and the operating state signal OSS4. Specifically, the frequency regulating circuit FRC4 outputs a frequency control signal FCS4 on the basis of the table T40 and the operating state signal OSS4. The frequency control signal FCS4 indicates the set frequency of the clock CK4. Based on the frequency control signal FCS4, the clock frequency control circuit CFCC4 controls the frequency of the clock CK4. Based on the table T4 and the operating state signal OSS4, the switching circuit SC4 outputs the switching requests SW14 and SW23. Also, based on the table T40 and the operating state signal OSS4, the switching circuit SC4 outputs the switching request SW25 and a voltage reduction request DW4. Based on the switching requests SW13 and SW24, the frequency regulating circuit FRC4 makes a transition between the control states. Also, based on the switching request SW15, the frequency regulating circuit FRC4 makes a transition between the control states, and outputs a voltage increase request UP4.

Referring to FIG. 19, based on the voltage increase request UP3, the power management unit 5 makes a transition from a state in which the power management unit 5 provides the normal voltage NV serving as an operating voltage to the core 3 to a state in which the power management unit 5 provides the overdrive voltage ODV as the operating voltage. The overdrive voltage ODV is higher than the normal voltage NV. In contrast, based on the voltage reduction request DW3, the power management unit 5 makes a transition from the state in which the power management unit 5 provides the overdrive voltage ODV serving as the operating voltage to the core 3 to the state in which the power management unit 5 provides the normal voltage NV as the operating voltage.

Referring to FIG. 19, based on the voltage increase request UP4, the power management unit 6 makes a transition from a state in which the power management unit 6 provides the normal voltage NV serving as an operating voltage to the core 4 to a state in which the power management unit 6 provides the overdrive voltage ODV as the operating voltage. The overdrive voltage ODV is higher than the normal voltage NV. In contrast, based on the voltage reduction request DW4, the power management unit 6 makes a transition from the state in which the power management unit 6 provides the overdrive voltage ODV serving as the operating voltage to the core 4 to the state in which the power management unit 6 provides the normal voltage NV as the operating voltage.

Figure 21A:
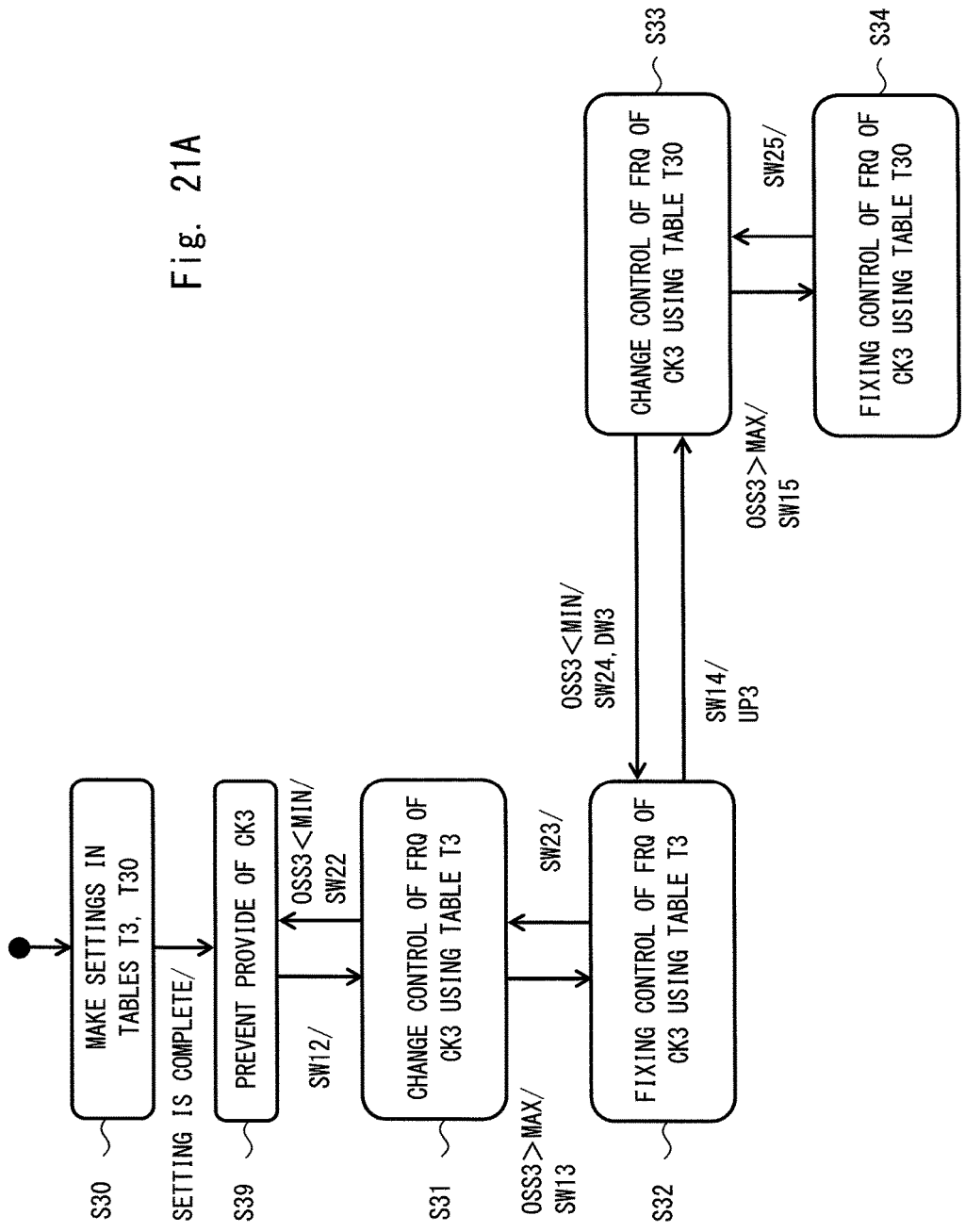
FIG. 21A is a state transition diagram of the third frequency regulating circuit according to the third embodiment.

Referring to FIG. 21A, the operation of the frequency regulating circuit FRC3 will be further described. FIG. 21A is a state transition diagram of the frequency regulating circuit FRC3. The frequency regulating circuit FRC3 can be placed in states S30, S39, and S31 to S34. In the initial state, S30, the frequency regulating circuit FRC3 makes settings in the tables T3 and T30. The states S39, S31, and S32, a transition between states S30 and S39, a transition between states S39 and S31, and a transition between states S31 and S32 are the same as those in the second embodiment. When the frequency regulating circuit FRC3 receives the switching request SW14 from the frequency regulating circuit FRC4, the frequency regulating circuit FRC3 outputs the voltage increase request UP3 to the power management unit 5 and makes a transition from state S32 to state S33.

In state S33, the frequency regulating circuit FRC3 controls the frequency of the clock CK3 on the basis of the table T30 and the operating state signal OSS3. In state S33, the frequency of the clock CK3 changes in accordance with a change in the performance value indicated by the operating state signal OSS3. The processing capacity of the core 3 when the frequency regulating circuit FRC3 is placed in state S33 is greater than that of the core 3 when the frequency regulating circuit FRC3 is placed in state S31. When the load on the application processor 601 is increased, the performance value indicated by the operating state signal OSS3 is increased as well. When the performance value indicated by the operating state signal OSS3 is greater than the largest of the performance values in the table T30, it can be judged that the load has been increased to the extent that the application processor 601 cannot process the load with the current processing capacity of the processor 601. Therefore, when the frequency regulating circuit FRC3 detects that the performance value indicated by the operating state signal OSS3 is greater than the largest of the performance values in the table T30, the frequency regulating circuit FRC3 outputs the switching request SW15 to the frequency regulating circuit FRC4 and makes a transition from state S33 to state S34.

In contrast, when the load on the application processor 601 is reduced, the performance value indicated by the operating state signal OSS3 is reduced as well. When the performance value indicated by the operating state signal OSS3 is smaller than the smallest of the performance values in the table T30, it can be judged that the load has been reduced to the extent that the current processing capacity of the application processor 601 is excessive with respect to the load. Therefore, when the frequency regulating circuit FRC3 detects that the performance value indicated by the operating state signal OSS3 is smaller than the smallest of the performance values in the table T30, the frequency regulating circuit FRC3 outputs the switching request SW24 to the frequency regulating circuit FRC4, outputs the voltage reduction request DW3 to the power management unit 5, and makes a transition from state S33 to state S32.

In state S34, the frequency regulating circuit FRC3 fixes the frequency of the clock CK3 to the largest frequency value in the table T30. The processing capacity of the core 3 when the frequency regulating circuit FRC3 is placed in state S34 is greater than that of the core 3 when the frequency regulating circuit FRC3 is placed in state S32. When the frequency regulating circuit FRC3 receives the switching request SW25 from the frequency regulating circuit FRC4, the frequency regulating circuit FRC3 makes a transition from state S34 to state S33.

Figure 21B:
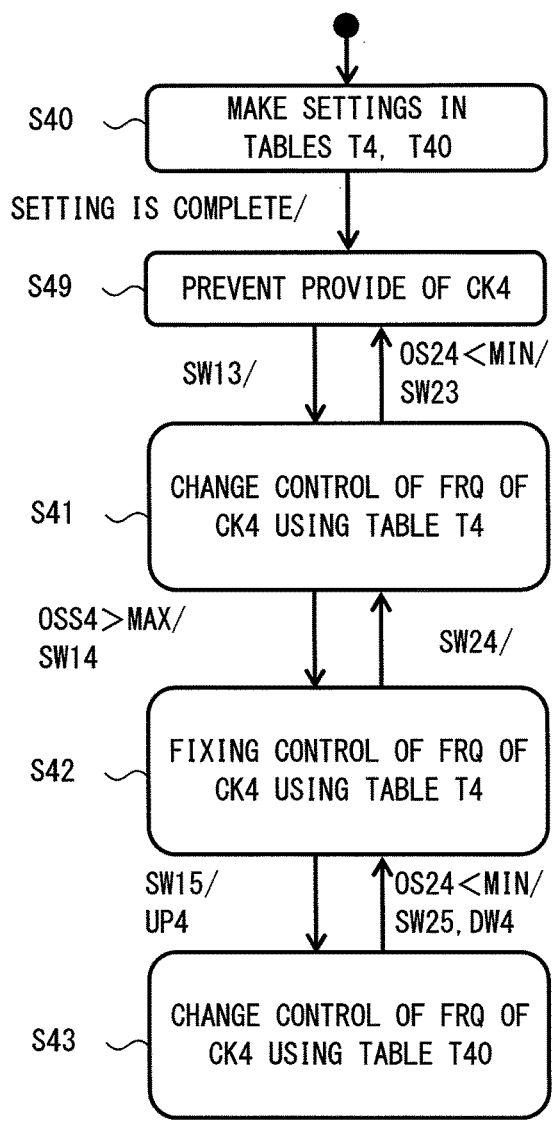
FIG. 21B is a state transition diagram of the fourth frequency regulating circuit according to the third embodiment.

Referring to FIG. 21B, the operation of the frequency regulating circuit FRC4 will be further described. FIG. 21B is a state transition diagram of the frequency regulating circuit FRC4. The frequency regulating circuit FRC4 can be placed in states S40, S49, and S41 to S43. In the initial state, S40, the frequency regulating circuit FRC4 makes settings in the tables T4 and T40. The states S49 and S41, transition between states S40 and S49, and a transition between states S49 and S41 are same as those in the second embodiment.

In state S41, when the load on the application processor 601 is increased, the performance value indicated by the operating state signal OSS4 is increased as well. When the performance value indicated by the operating state signal OSS4 is greater than the largest of the performance values in the table T4, it can be judged that the load has been increased to the extent that the application processor 601 cannot process the load with the current processing capacity of the processor 601. Therefore, when the frequency regulating circuit FRC4 detects that the performance value indicated by the operating state signal OSS4 is greater than the largest of the performance values in the table T4, the frequency regulating circuit FRC4 outputs the switching request SW14 to the frequency regulating circuit FRC3 and makes a transition from state S41 to state S42.

In state S42, the frequency regulating circuit FRC4 fixes the frequency of the clock CK4 to the largest frequency value in the table T4. When the frequency regulating circuit FRC4 receives the switching request SW15 from the frequency regulating circuit FRC3, the frequency regulating circuit FRC4 outputs the voltage increase request UP4 to the power management unit 6 and makes a transition from state S42 to state S43. When the frequency regulating circuit FRC4 receives the switching request SW24 from the frequency regulating circuit FRC3, the frequency regulating circuit FRC4 makes a transition from state S42 to state S41.

In state S43, the frequency regulating circuit FRC4 controls the frequency of the clock CK4 on the basis of the table T40 and the operating state signal OSS4. In state S43, the frequency of the clock CK4 changes in accordance with a change in the performance value indicated by the operating state signal OSS4. The processing capacity of the core 4 when the frequency regulating circuit FRC4 is placed in state S43 is greater than that of the core 4 when the frequency regulating circuit FRC4 is placed in state S41. When the load on the application processor 601 is reduced, the performance value indicated by the operating state signal OSS4 is reduced as well. When the performance value indicated by the operating state signal OSS4 is smaller than the smallest of the performance values in the table T40, it can be judged that the load has been reduced to the extent that the current processing capacity of the application processor 601 is excessive with respect to the load. Therefore, when the frequency regulating circuit FRC4 detects that the performance value indicated by the operating state signal OSS4 is smaller than the smallest of the performance values in the table T40, the frequency regulating circuit FRC4 outputs the switching request SW25 to the frequency regulating circuit FRC3, outputs the voltage reduction request DW4 to the power management unit 6, and makes a transition from state S43 to state S42.

Figure 21C:
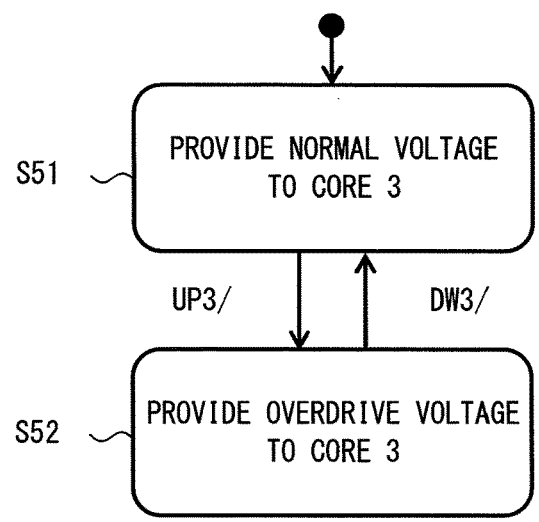
FIG. 21C is a state transition diagram of a power management unit which provides an operating voltage to a third CPU core.

Referring to FIG. 21C, the operation of the power management unit 5 will be further described. FIG. 21C is a state transition diagram of the power management unit 5. The power management unit 5 can be placed in states S51 and S52. In the initial state, S51, the power management unit 5 provides the normal voltage NV serving as an operating voltage to the core 3. When the power management unit 5 receives the voltage increase request UP3 from the frequency regulating circuit FRC3, the power management unit 5 makes a transition from state S51 to state S52. In state S52, the power management unit 5 provides the overdrive voltage ODV serving as the operating voltage to the core 3. In contrast, when the power management unit 5 receives the voltage reduction request DW3 from the frequency regulating circuit FRC3, the power management unit 5 makes a transition from state S52 to state S51. As seen above, in both the case where the frequency regulating circuit FRC3 is placed in state S31 and the case where it is placed in state S32, the power management unit 5 is placed in state S51. On the other hand, in both the case where the frequency regulating circuit FRC3 is placed in state S33 and the case where it is placed in state S34, the power management unit 5 is placed in state S52.

Figure 21D:
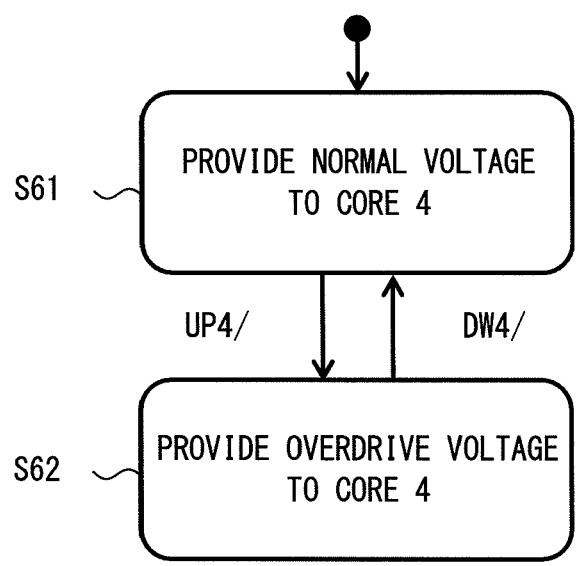
FIG. 21D is a state transition diagram of a power management unit which provides an operating voltage to a fourth CPU core.

Referring to FIG. 21D, the operation of the power management unit 6 will be further described. FIG. 21D is a state transition diagram of the power management unit 6. The power management unit 6 can be placed in states S61 and S62. In the initial state, S61, the power management unit 6 provides the normal voltage NV serving as an operating voltage to the core 4. When the power management unit 6 receives the voltage increase request UP4 from the frequency regulating circuit FRC4, the power management unit 6 makes a transition from state S61 state S62. In state S62, the power management unit 6 provides the overdrive voltage ODV serving as the operating voltage to the core 4. In contrast, when the power management unit 6 receives the voltage reduction request DW4 from the frequency regulating circuit FRC4, the power management unit 6 makes a transition from state S62 to state S61. As seen above, in both the case where the frequency regulating circuit FRC4 is placed in state S41 and the case where it is placed in state S42, the power management unit 6 is placed in state S61. On the other hand, when the frequency regulating circuit FRC4 is placed in state S43, the power management unit 6 is placed in state S62.

Note that in the present embodiment, the operating state signals OSS1 to OSS4 may indicate the idle states of the cores 1 to 4, respectively. In this case, the frequency regulating circuits FRC1 to FRC4 output frequency control signals FCS1 to FCS4, respectively, through processes the same as that of the frequency regulating circuit FRC1 according to the modification of the first embodiment.

According to the present embodiment, clock controls and operating voltage controls for the plurality of CPU cores can be coordinated. Thus the performance of the entire application processor 601 can more satisfactorily follow the dynamically changing load.

<Variations>

In the foregoing, while the invention made by the inventors has been specifically explained based on the embodiments, it goes without saying that the present invention is not limited to the above-described embodiments, and that various modifications can be made within the range not departing from the gist of the present invention. For example, transitions may be made among the control states on the basis of comparisons between thresholds different from the tables T1 to T4, T30, and T40 and the operating state signals OSS1 to OSS4.

The first to third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that the Applicant's intent is to encompass equivalents of all claim elements, even if amended later during prosecution.

What is claimed is:

1. A semiconductor device comprising:
    (a) a first CPU core;
    (b) a first frequency regulating circuit comprising a first table;
    (c) a first clock frequency control circuit configured to provide a first clock to the first CPU core;
    (d) a second CPU core;
    (e) a second frequency regulating circuit comprising a second table; and
    (f) a second clock frequency control circuit, wherein
    the first CPU core outputs a first operating state signal indicating an operating state of the first CPU core,
    the second CPU core outputs a second operating state signal indicating an operating state of the second CPU core,
    the first frequency regulating circuit controls a frequency of the first clock based on the first table and the first operating state signal,
    wherein the first table comprises a plurality of clock frequency values and a plurality of performance values, each clock frequency value corresponding to a respective one of the performance values,
    the first frequency regulating circuit is configured to select for the frequency of the first clock one of the clock frequency values from the first table having a corresponding performance value that matches a current performance requirement indicated by the first operating state signal,
    the first frequency regulating circuit fixes the frequency of the first clock at a largest value of the plurality of clock frequency values in the first table and outputs a first switching request, when the first operating state signal indicates that the current performance requirement exceeds all of the plurality of performance values in the first table,
    based on the first switching request, the second frequency regulating circuit causes the second clock frequency control circuit to start providing a second clock to the second CPU core and controls a frequency of the second clock based on the second table and the second operating state signal, and
    each of the performance values comprises at least one of:
        a number of instructions per unit time of the first CPU core;
        a ratio of number of instructions per unit time to a maximum number of instructions per unit time of the first CPU core; and
        operating periods or idle periods per unit time of the first CPU core.

2. The semiconductor device according to claim 1, wherein
    the first frequency regulating circuit further comprises a third table,
    when the first frequency regulating circuit outputs the first switching request, the first frequency regulating circuit makes a transition from a first clock first change control state, in which the first frequency regulating circuit controls the frequency of the first clock based on the first table and the first operating state signal, to a first clock first fixed control state, in which the first frequency regulating circuit sets the frequency of the first clock to a first fixed value regardless of the current performance requirement,
    based on the second operating state signal, the second frequency regulating circuit makes a transition from a second clock first change control state, in which the second frequency regulating circuit controls the frequency of the second clock based on the second table and the second operating state signal, to a second clock first fixed control state, in which the second frequency regulating circuit sets the frequency of the second clock to a second fixed value regardless of the current performance requirement, and outputs a second switching request when making the transition from the second clock first change control state to the second clock first fixed control state,
    based on the second switching request, the first frequency regulating circuit makes a transition from the first clock first fixed control state to a first clock second change control state, in which the first frequency regulating circuit controls the frequency of the first clock based on the third table and the first operating state signal, and outputs a voltage increase request to a power management circuit when making the transition from the first clock first fixed control state to the first clock second change control state, and based on the voltage increase request, the power management circuit makes a transition from a normal voltage control state, in which the power management circuit provides a first voltage serving as an operating voltage to the first CPU core, to an overdrive voltage control state, in which the power management circuit provides a second voltage serving as the operating voltage to the first CPU core, wherein the second voltage is higher than the first voltage.

3. The semiconductor device according to claim 1, wherein
the first operating state signal indicates an idle state of the first CPU core,
the first frequency regulating circuit further comprises a period calculator configured to calculate, based on the first operating state signal, an operating period or idle period per unit time of the first CPU core as the current performance requirement, and
each performance value in the first table is an operating period or idle period per unit time.

4. The semiconductor device according to claim 1, wherein
the first table comprises:
(i) registers configured to store a combination of a first value of the plurality of performance values and a second value of the plurality of clock frequency values and a combination of a third value of the plurality of performance values and a fourth value of the plurality of clock frequency values; and
(ii) an interpolation calculator configured to calculate a combination of a fifth value of the plurality of performance values and a sixth value of the plurality of clock frequency values, the combination of the fifth and sixth values being interpolated between the combination of the first and second values and the combination of the third and fourth values, and
a value of the current performance requirement is either indicated by the first operating state signal or calculated by the first frequency regulating circuit based on the first operating state signal.

5. An electronic device comprising (a) a semiconductor device, wherein
the semiconductor device comprises:
(i) a first CPU core;
(ii) a first frequency regulating circuit comprising a first table;
(iii) a first clock frequency control circuit configured to provide a first clock to the first CPU core;
(iv) a second CPU core;
(v) a second frequency regulating circuit comprising a second table; and
(vi) a second clock frequency control circuit,
the first CPU core outputting a first operating state signal indicating an operating state of the first CPU core,
the second CPU core outputting a second operating state signal indicating an operating state of the second CPU core,
the first frequency regulating circuit controls a frequency of the first clock based on the first table and the first operating state signal, wherein the first table comprises a plurality of clock frequency values and a plurality of performance values, each clock frequency value corresponding to a respective one of the performance values,
the first frequency regulating circuit is configured to select for the frequency of the first clock one of the clock frequency values from the first table having a corresponding performance value that matches a current performance requirement indicated by the first operating state signal,
the first frequency regulating circuit fixing the frequency of the first clock at a largest value of the plurality of clock frequency values in the first table and outputting a first switching request, when the first operating state signal indicates that the current performance requirement exceeds all of the plurality of performance values in the first table,
based on the first switching request, the second frequency regulating circuit causes the second clock frequency control circuit to start providing a second clock to the second CPU core and controls a frequency of the second clock based on the second table and the second operating state signal, and
each of the performance values comprises at least one of:
a number of instructions per unit time of the first CPU core;
a ratio of number of instructions per unit time to a maximum number of instructions per unit time of the first CPU core; and
operating periods or idle periods per unit time of the first CPU core.

6. The electronic device according to claim 5, further comprising (b) a power management circuit configured to provide an operating voltage to the first CPU core, wherein
the first frequency regulating circuit further comprises a third table,
when the first frequency regulating circuit outputs the first switching request, the first frequency regulating circuit makes a transition from a first clock first change control state, in which the first frequency regulating circuit controls the frequency of the first clock based on the first table and the first operating state signal, to a first clock first fixed control state, in which the first frequency regulating circuit sets the frequency of the first clock to a first fixed value regardless of the current performance requirement,
based on the second operating state signal, the second frequency regulating circuit makes a transition from a second clock first change control state, in which the second frequency regulating circuit controls the frequency of the second clock based on the second table and the second operating state signal, to a second clock first fixed control state, in which the second frequency regulating circuit sets the frequency of the second clock to a second fixed value regardless of the current performance requirement, and outputs a second switching request when making a transition from the second clock first change control state to the second clock first fixed control state,
based on the second switching request, the first frequency regulating circuit makes a transition from the first clock first fixed control state to a first clock second change control state, in which the first frequency regulating circuit controls the frequency of the first clock based on the third table and the first operating state signal,
in both a case where the first frequency regulating circuit is placed in the first clock first change control state and a case where the first frequency regulating circuit is placed in the first clock first fixed state, the power management circuit provides a first voltage as the operating voltage, and when the first frequency regulating circuit is placed in the first clock second change control state, the power management circuit provides a second voltage as the operating voltage, the second voltage being higher than the first voltage.

7. A method for controlling a semiconductor device, wherein the semiconductor device comprises (i) a first CPU core; (ii) a first frequency regulating circuit comprising a first table; (iii) a first clock frequency control circuit configured to provide a first clock to the first CPU core; (iv) a second CPU core; (v) a second frequency regulating circuit comprising a second table; and (vi) a second clock frequency control circuit, the method comprising:

(a) outputting, by the first CPU core, a first operating state signal indicating an operating state of the first CPU core;

(b) controlling, by the first frequency regulating circuit, a frequency of the first clock based on the first table and the first operating state signal;

(c) when the first operating state signal indicates that the current performance requirement exceeds all of the plurality of performance values in the first table, fixing, by the first frequency regulating circuit, the frequency of the first clock at a largest value of the plurality of clock frequency values in the first table and outputting, by the first frequency regulating circuit, a first switching request;

(d) based on the first switching request, causing, by the second frequency regulating circuit, the second clock frequency control circuit to start providing a second clock to the second CPU core;

(e) outputting, by the second CPU core, a second operating state signal indicating an operating state of the second CPU core; and (f) controlling, by the second frequency regulating circuit, a frequency of the second clock based on the second table and the second operating state signal, wherein the first table comprises a plurality of clock frequency values and a plurality of performance values, each clock frequency value corresponding to a respective one of the performance values, step (b) comprises selecting, by the first frequency regulating circuit, for the frequency of the first clock one of the clock frequency values from the first table having a corresponding performance value that matches a current performance requirement indicated by the first operating state signal, and each of the performance values comprises at least one of:
a number of instructions per unit time of the first CPU core;
a ratio of number of instructions per unit time to a maximum number of instructions per unit time of the first CPU core; and
operating periods or idle periods per unit time of the first CPU core.

8. The method according to claim claim 7, wherein the first frequency regulating circuit further comprises a third table, the method further comprising:

(g) when the first frequency regulating circuit outputs the first switching request, making, by the first frequency regulating circuit, a transition from a first clock first change control state, in which the first frequency regulating circuit controls the frequency of the first clock based on the first table and the first operating state signal, to a first clock first fixed control state, in which the first frequency regulating circuit sets the frequency of the first clock to a first fixed value regardless of the current performance requirement, (h) based on the second operating state signal, making, by the second frequency regulating circuit, a transition from a second clock first change control state, in which the second frequency regulating circuit controls the frequency of the second clock based on the second table and the second operating state signal, to a second clock first fixed control state, in which the second frequency regulating circuit sets the frequency of the second clock to a second fixed value regardless of the current performance requirement;

(i) when the second frequency regulating circuit makes the transition from the second clock first change control state to the second clock first fixed control state, outputting, by the second frequency regulating circuit, a second switching request;

(j) based on the second switching request, making, by the first frequency regulating circuit, a transition from the first clock first fixed control state to a first clock second change control state, in which the first frequency regulating circuit controls the frequency of the first clock based on the third table and the first operating state signal;

(k) when the first frequency regulating circuit makes the transition from the first clock first fixed control state to the first clock second change control state, outputting, by the first frequency regulating circuit, a voltage increase request to a power management circuit; and (l) based on the voltage increase request, making, by the power management circuit, a transition from a normal voltage control state, in which the power management circuit provides a first voltage serving as an operating voltage to the first CPU core, to an overdrive voltage control state, in which the power management circuit provides a second voltage serving as the operating voltage to the first CPU core, wherein the second voltage is higher than the first voltage.

9. A semiconductor device comprising:

a first Central Processing Unit (CPU) core that operates based on a first clock, and that outputs a first operating state signal indicating a performance value of the first CPU core;

a first frequency regulating circuit that is coupled to the first CPU core, that includes a first table including a plurality of frequency values of the first clock and a plurality of performance values of the first CPU core, each frequency value corresponding to a respective one of the performance values, and that outputs a first frequency control signal based on the first operating state signal and the first table;

a first clock frequency control circuit that is coupled to the first CPU core and the first frequency regulating circuit, and that outputs the first clock based on the first frequency control signal;

a second CPU core that operates based on a second clock, and that outputs a second operating state signal indicating a performance value of the second CPU core;

a second frequency regulating circuit that is coupled to the second CPU core, that includes a second table including a plurality of frequency values of the second clock and a plurality of performance values of the second CPU core, each frequency value corresponding to a respective one of the performance values, and that outputs a second frequency control signal based on the second operating state signal and the second table; and a second clock frequency control circuit that is coupled to the second CPU core and the second frequency regulating circuit, and that outputs the second clock based on the second frequency control signal, wherein the first frequency regulating circuit includes a first switching circuit outputting a first switching request when the performance value of the first CPU core indicated by the first operating state signal is larger than a maximum value among the performance values included in the first table, and makes, when the first switching circuit outputs the first switching request, a transition from a first clock first change control state, in which the first frequency regulating circuit controls the frequency of the first clock based on the first operating state signal and the first table, to a first clock first fixed control state, in which the first frequency regulating circuit sets the frequency of the first clock to a first fixed value, wherein, in response to the first switching request, the second frequency regulating circuit causes the second clock frequency control circuit to start providing the second clock to the second CPU core, and is placed in a second clock first change control state, in which the second frequency regulating circuit controls the frequency of the second clock based on the second operating state signal and the second table, wherein the second frequency regulating circuit includes a second switching circuit outputting a second switching request when the performance value of the second CPU core indicated by the second operating state signal is lower than a minimum value among the performance values included in the second table, and causes, when the second switching circuit outputs the second switching request, the second clock frequency control circuit to stop providing the second clock to the second CPU core, and wherein, the first frequency regulating circuit makes a transition from the first clock first fixed control state to the first clock first change control state in response to the second switching request.

10. The semiconductor device according to claim 9, wherein the first fixed value comprises a maximum value which can be set by the first table.

11. The semiconductor device according to claim 9, wherein an operating frequency and a performance of the first CPU core is lower than those of the second CPU core.

12. The semiconductor device according to claim 9, wherein, for a music play mode where the first CPU core performs processing associated with playing music, a first plurality of combinations of frequency values of the first clock and performance values of the first CPU core that conform to the music play mode are provided in the first table, wherein, for a touch panel input operation mode where the first CPU core performs processing associated with input operation via a touch panel, a second plurality of combinations of frequency values of the first clock and performance values of the first CPU core that conform to the touch panel input operation mode are provided in the first table, and wherein a maximum frequency value of the first clock that can be set by the first table for the music play mode is lower than that of the first clock that can be set by the first table for the touch panel input operation mode.

13. The semiconductor device according to claim 9, wherein, for a music play mode where the first CPU core performs processing associated with playing music, a first plurality of combinations of frequency values of the first clock and performance values of the first CPU core that conform to the music play mode are provided in the first table, wherein, for a three dimensional graphics mode where the first CPU core performs processing of three dimensional graphics, a third plurality of combinations of frequency values of the first clock and performance values of the first CPU core that conform to the three dimensional graphics mode are provided in the first table, and wherein a maximum frequency value of the first clock that can be set by the first table for the music play mode is lower than that of the first clock that can be set by the first table for the three dimensional graphics mode.

14. The semiconductor device according to claim 9, wherein, for a touch panel input operation mode where the first CPU core performs processing associated with input operation via a touch panel, a second plurality of combinations of frequency values of the first clock and performance values of the first CPU core that conform to the touch panel input operation mode are provided in the first table, wherein, for a three dimensional graphics mode where the first CPU core performs processing of three dimensional graphics, a third plurality of combinations of frequency values of the first clock and performance values of the first CPU core that conform to the three dimensional graphics mode are provided in the first table, and wherein a maximum frequency value of the first clock that can be set by the first table for the touch panel input operation mode is larger than that of the first clock that can be set by the first table for the three dimensional graphics mode.

15. The semiconductor device according to claim 9, wherein each of the performance values comprises at least one of:
 a number of instructions per unit time of the respective CPU core;
 a ratio of number of instructions per unit time to a maximum number of instructions per unit time of the respective CPU core; and
 operating periods or idle periods per unit time of the respective CPU core.

* * * * *